(12) United States Patent
Yamada et al.

(10) Patent No.: US 10,594,473 B2
(45) Date of Patent: Mar. 17, 2020

(54) TERMINAL DEVICE, DATABASE SERVER, AND CALCULATION SYSTEM

(71) Applicant: KABUSHIKIKAISHA RNAi, Tokyo (JP)

(72) Inventors: Tomoyuki Yamada, Tokyo (JP); Masahiro Hattori, Tokyo (JP)

(73) Assignee: KABUSHIKIKAISHA RNAi, Tokyo (JP)

( * ) Notice: Subject to any disclaimer, the term of this patent is extended or adjusted under 35 U.S.C. 154(b) by 279 days.

(21) Appl. No.: 15/668,785

(22) Filed: Aug. 4, 2017

(65) Prior Publication Data

US 2018/0034626 A1 Feb. 1, 2018

Related U.S. Application Data

(63) Continuation of application No. PCT/JP2016/052342, filed on Jan. 27, 2016.

(30) Foreign Application Priority Data

Feb. 10, 2015 (JP) ................................ 2015-024759

(51) Int. Cl.
*H04L 9/00* (2006.01)
*G06F 16/2455* (2019.01)
(Continued)

(52) U.S. Cl.
CPC ............ *H04L 9/008* (2013.01); *G06F 16/242* (2019.01); *G06F 16/24553* (2019.01);
(Continued)

(58) Field of Classification Search
CPC . H04L 9/08; H04L 9/30; H04L 9/3006; H04L 9/085; H04L 63/0428; H04L 63/061; G06F 21/6218; G06F 21/6227; G06F 21/60–629; G06F 21/86; G06F 21/87
See application file for complete search history.

(56) References Cited

U.S. PATENT DOCUMENTS 9,087,212 B2 * 7/2015 Balakrishnan ...... G06F 21/6227
2002/0174115 A1 11/2002 Shibuya et al.
(Continued)

FOREIGN PATENT DOCUMENTS

JP 2002-351908 A 12/2002
JP 2009-271584 A 11/2009
(Continued)

OTHER PUBLICATIONS

International Search Report with Written Opinion of the International Searching Authority issued for corresponding International Patent Application No. PCT/JP2016/052342, dated Apr. 26, 2016, with English translation.

*Primary Examiner* — Khalil Naghdali
*Assistant Examiner* — Shaqueal D Wade
(74) *Attorney, Agent, or Firm* — Myers Wolin, LLC.

(57) ABSTRACT

A database server stores encrypted vector data in which each of a plurality of elements is encrypted by encryption maintaining semi-homomorphism between calculation before encryption and calculation after encryption. The database server receives an obfuscated query (N-randomized query) from a terminal device, performs calculation for each of a plurality of segments of vectors of the obfuscated query with a segment of the encrypted vector data, and transmits the calculation to the terminal device in reply. The terminal device may acquire a result of decryption calculation transmitted in reply by a decryption device.

15 Claims, 23 Drawing Sheets

(51) Int. Cl.
*H04L 29/06* (2006.01)
*H04L 9/30* (2006.01)
*G06F 16/242* (2019.01)
*G06F 21/62* (2013.01)

(52) U.S. Cl.
CPC ............ *G06F 21/6218* (2013.01); *H04L 9/30* (2013.01); *H04L 9/3006* (2013.01); *H04L 63/0428* (2013.01); *H04L 63/061* (2013.01); *G06F 2221/2107* (2013.01); *H04L 2209/08* (2013.01)

(56) References Cited

U.S. PATENT DOCUMENTS

| | | | |
|---|---|---|---|
| 2005/0259817 A1* | 11/2005 | Ramzan | G06F 21/6227 380/46 |
| 2009/0006855 A1 | 1/2009 | Tuyls et al. | |
| 2013/0262863 A1 | 10/2013 | Yoshino et al. | |
| 2014/0355756 A1 | 12/2014 | Iwamura et al. | |
| 2015/0088898 A1* | 3/2015 | Branch | G06F 16/24561 707/741 |
| 2016/0182222 A1* | 6/2016 | Rane | H04L 9/008 713/168 |

FOREIGN PATENT DOCUMENTS

| | | |
|---|---|---|
| JP | 4938678 B2 | 5/2012 |
| JP | 2012-227801 A | 11/2012 |
| JP | 2013-125039 A | 6/2013 |
| JP | 2013-130825 A | 7/2013 |
| JP | 2013-145420 A | 7/2013 |
| JP | 2013-205655 A | 10/2013 |
| JP | 5412414 B2 | 2/2014 |
| WO | 2013/038698 A1 | 3/2015 |

* cited by examiner

FIG. 5

| 501 | 502 | | | |
|---|---|---|---|---|
| 1 | $E_{nc}(a_{11})$ | $E_{nc}(a_{12})$ | ... | $E_{nc}(a_{1M})$ |
| 2 | $E_{nc}(a_{21})$ | $E_{nc}(a_{22})$ | ... | $E_{nc}(a_{2M})$ |
| 3 | $E_{nc}(a_{31})$ | $E_{nc}(a_{32})$ | ... | $E_{nc}(a_{3M})$ |
| ⋮ | ⋮ | ⋮ | ⋮ | ⋮ |
| N | $E_{nc}(a_{N1})$ | $E_{nc}(a_{N2})$ | ... | $E_{nc}(a_{NM})$ |

FIG. 6

| | 501 | 502 | | | 601 |
|---|---|---|---|---|---|
| 1 | $Enc(a_{11})$ | $Enc(a_{12})$ | ... | $Enc(a_{1M})$ | $Enc(V_1)$ |
| 2 | $Enc(a_{21})$ | $Enc(a_{22})$ | ... | $Enc(a_{2M})$ | $Enc(V_2)$ |
| 3 | $Enc(a_{31})$ | $Enc(a_{32})$ | ... | $Enc(a_{3M})$ | $Enc(V_3)$ |
| ⋮ | ⋮ | ⋮ | ⋮ | ⋮ | ⋮ |
| N | $Enc(a_{N1})$ | $Enc(a_{N2})$ | ... | $Enc(a_{NM})$ | $Enc(V_N)$ |

FIG. 9 (A)
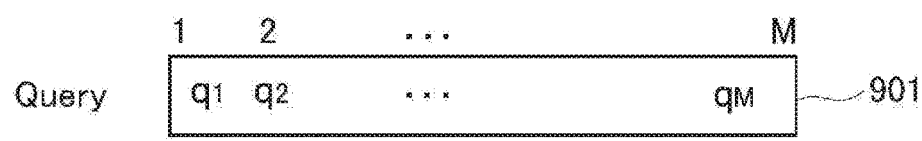
FIG. 9 (B)
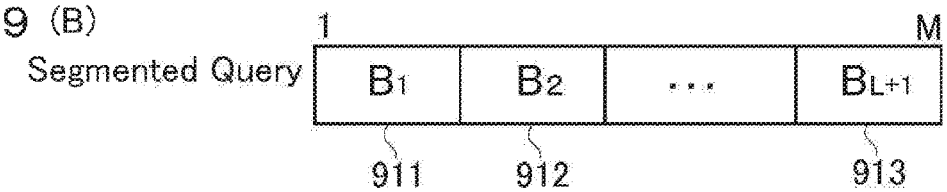
FIG. 9 (C)
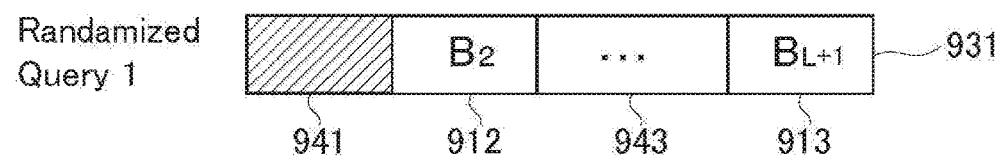
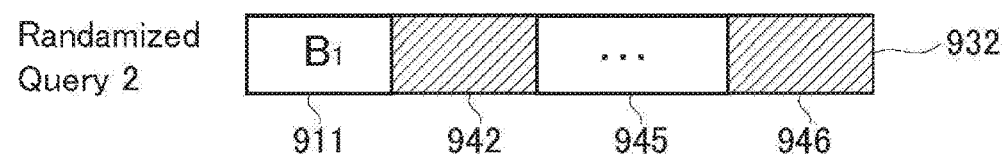
FIG. 9 (D)
| 951 | 952 |
|---|---|
| 1 | 2 |
| 2 | 1 |
| ⋮ | ⋮ |
| L+1 | 1 |

TERMINAL DEVICE, DATABASE SERVER, AND CALCULATION SYSTEM

CROSS-REFERENCE TO RELATED APPLICATION

This application is a continuation of PCT/JP2016/052342 filed on Jan. 27, 2016 and claims the benefit of priority of the prior Japanese Patent application No. 2015-024759, filed on Feb. 10, 2015, the entire contents of which are incorporated herein by reference.

TECHNICAL FIELD

The present invention relates to a database server, a query device (terminal device), a database system, a calculation system, etc. In particular, the present invention relates to a database server, a query device, a database system, etc. capable of processing a query without an information provider of data stored in the database server and a database server administrator being aware of content of the query, and capable of obtaining a calculation result according to a query after encryption by an encryption key of the information provider without decryption.

BACKGROUND ART

A cloud service is available, and various database services are providable through the Internet. In other words, an information provider may store various types of data in a database server provided by a cloud service provider and provide a database service. In this case, it is unnecessary for the information provider to manage the database server, and borrows the database server managed by the cloud service provider.

In provision of such a database service, since the cloud service provider different from the information provider manages the database server, there is a possibility that risk of data leakage may increase. For example, the cloud service provider may directly access the data stored in the provided database server, and the information provider may hesitate to provide valuable data. In addition, even for a user of the database service, the cloud service provider and the information provider may be aware of what kind of query was issued to a database. For this reason, since there is a possibility that intention of the user of the database service will be presumed by another person, the user may hesitate to use the database service.

A concealment calculation technology that allows query management in a state in which both or one of a query and data stored in a database server is encrypted has been proposed to solve the above-mentioned problem (for example, see Patent Literatures 1 to 9).

CITATION LIST

Patent Literature

Patent Literature 1: WO 2013/038698 A
Patent Literature 2: JP 5412414 B1
Patent Literature 3: JP 2012-227801 A
Patent Literature 4: JP 2013-130825 A
Patent Literature 5: JP 2013-145420 A
Patent Literature 6: JP 2013-125039 A
Patent Literature 7: JP 2013-205655 A
Patent Literature 8: JP 2009-271584 A
Patent Literature 9: JP 4938678 B1

SUMMARY OF INVENTION

Technical Problem

In a conventional technology, concealment of a query is insufficient among an information provider, a database server administrator, and a user who searches a database. For example, even when a query of the user is hidden from the information provider, data stored in the database is not hidden from the database server administrator in some cases.

Solution to Problem

A database server including a database, a receiver, and a calculation processing unit is provided as an embodiment of the invention. The database stores encrypted vector data. The encrypted vector data is obtained by encrypting each of a plurality of elements included in data using an encryption process that maintains semi-homomorphism between first calculation and second calculation in which a result of the first calculation before encryption corresponds to a result obtained by decrypting a result of the second calculation after encryption. A receiver segments query vectors having query data into a plurality of segments, and receives a plurality of obfuscated query vectors, each of which includes one or more of a plurality of segments and a random segment including random data and which may restore the query vectors, from a terminal of an information searcher. A calculation processing unit calculates a plurality of calculation results encrypted by a public key of an information provider for a partial sequence of raw elements of the encrypted vector data and each of the random segment or any one of the plurality of segments included in each of the plurality of obfuscated query vectors by the semi-homomorphism.

Advantageous Effects of Invention

According to the invention, only an information provider may decrypt data stored in a database server, and it is possible to make it difficult for the information provider and a database server administrator to detect content of a query of a user who searches a database.

BRIEF DESCRIPTION OF DRAWINGS

FIG. 5 is an example diagram of vector data stored in the database server of the system according to the embodiment of the invention.

FIG. 6 is an example diagram of vector data stored in the database server of the system according to the embodiment of the invention.

FIG. 9(A) is an example diagram of a query vector.

FIG. 9(B) is an example diagram of a segmented query vector.

FIG. 9(C) is an example diagram of an obfuscated query vector.

FIG. 9(D) is an example diagram of obfuscation information.

DESCRIPTION OF EMBODIMENTS

Hereinafter, modes for implementing the invention will be described as some embodiments with reference to drawings. The invention is not to be construed as being limited to the embodiments described below. The invention may be implemented by variously modifying the embodiments described below.

(First Embodiment)

Figure 1:
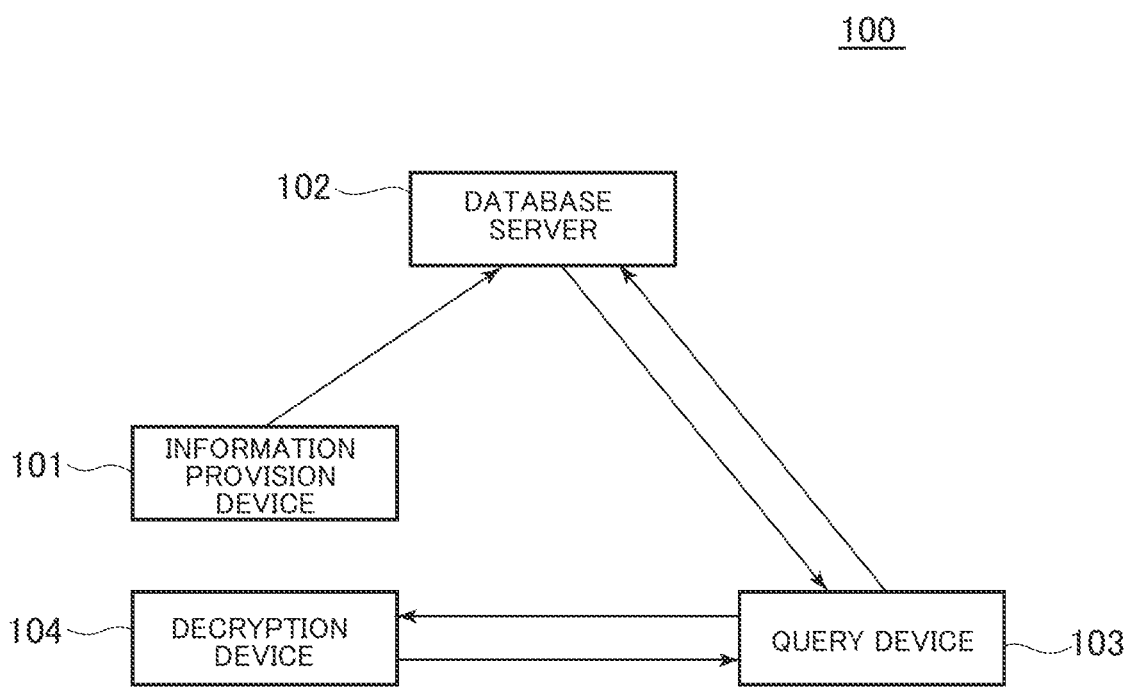
FIG. 1 is a function block diagram of a system according to an embodiment of the invention.

FIG. 1 illustrates a function block diagram of a system according to an embodiment of the invention. A system 100 includes an information provision device 101, a database server 102, a query device 103, and a decryption device 104. The query device 103 may be referred to as a "terminal device 103".

In the present embodiment, normally, it is presumed that an operator of the information provision device 101 (that is, an information provider), an administrator of the database server 102, and a user of the query device 103 are different from one another. In addition, an operator of the decryption device 104 may be the same as the operator of the information provision device 101.

An outline of an operation of the system 100 is described below. (Step A) Data including encrypted data subjected to an encryption process by the information provision device 101 (for example, vector data including a plurality of elements subjected to encryption processes) is stored in the database server. (Step B) The query device 103 transmits a query (for example, a query vector including a plurality of query data elements) to the database server. In this case, instead of being sent in plaintext, the query is subjected to an obfuscation process corresponding to a type of encryption process in the query device 103, and is transmitted to the database server 102 after being put in a state in which the deobfuscated query is made difficult to restore by the administrator of the database server 102 and the operator of the information provision device 101. (Step C) The database server 102 performs calculation with respect to the encrypted data in response to the received query, and transmits a result thereof to the query device 103 in reply. In this instance, the result transmitted to the query device 103 in reply is subjected to an encryption process. In addition, a decryption process may be excluded from calculation with respect to the encrypted data in the database server 102. (Step D) The query device 103 transmits all or a part of the result, which has been transmitted in reply, to the decryption device 104 to decrypt the all or the part of the result. The decryption device 104 performs a decryption process corresponding to the encryption process performed by the information provision device 101. (Step E) The query device 103 may receive the result subjected to the decryption process, and perform the deobfuscation process to obtain a calculation result. Performing an encryption process may be referred to as encrypting. Similarly, performing a decryption process may be referred to as decrypting.

The encryption process of step A may be performed such that both the administrator of the database server 102 and the user of the query device 103 are not allowed to decrypt data.

The obfuscation process of step B may be performed such that the administrator of the database server 102 and the operator of the information provision device 101 are not allowed to detect intention of the user of the query device 103 from content of the query. The obfuscation process may be referred to as a "process of generating N-randomized vectors". Here, "N" may correspond to a sequence of natural numbers representing the number of segments obtained by segmenting the query or segment positions of the query. For example, data obtained by obfuscation that performs segmentation into a segment of up to a fourth element of a query, a segment from a fifth element to a sixth element of the query, and a segment from a seventh element of the query is referred to as a 3-randomized vector or a (4, 6)-randomized vector.

The result in step C is encrypted by an encryption key corresponding to the encryption process performed by the information provision device 101, and both the administrator of the database server 102 and the user of the query device 103 may be disallowed to perform the decryption process on the calculation result.

In step D, since the calculation result obtained by obfuscating the query is transmitted to the decryption device 104, it may be difficult for the decryption device 104 to detect intention of the user of the query device 103 from a result of the decryption process even when the decryption process is performed. For example, it is possible to make it difficult for the decryption device 104 to detect an object for which the user of the query device 103 attempts to search.

The deobfuscation process in step E may be performed on the user side of the query device 103 such that the administrator of the database server 102 and the operator of the information provision device 101 are not aware of the result.

Therefore, in the embodiment of the invention, since data stored in the database server 102 is encrypted, anyone other than the operator of the information provision device 101 may be disallowed to perform decryption even when the data leaks out of the database server 102. In addition, since the query transmitted by the query device 103 is obfuscated, the administrator of the database server 102 and the operator of the information provision device 101 may be disallowed to know intention of the user of the query device 103. In addition, since the result of the query is affected by the obfuscation, intention of the user of the query device 103 may be disallowed to be detected even when the operator of the information provision device 101 is aware of the result of the query. Further, since the result of the query is encrypted, the administrator of the database server 102 may be disallowed to decrypt the result of the query. In addition, since the calculation result is affected by obfuscation in the decryption device 104, it is possible to make it difficult for the administrator of the decryption device 104 to detect intention of the user of the query device 103 from the result of the decryption process even when the decryption process is performed.

Figure 2:
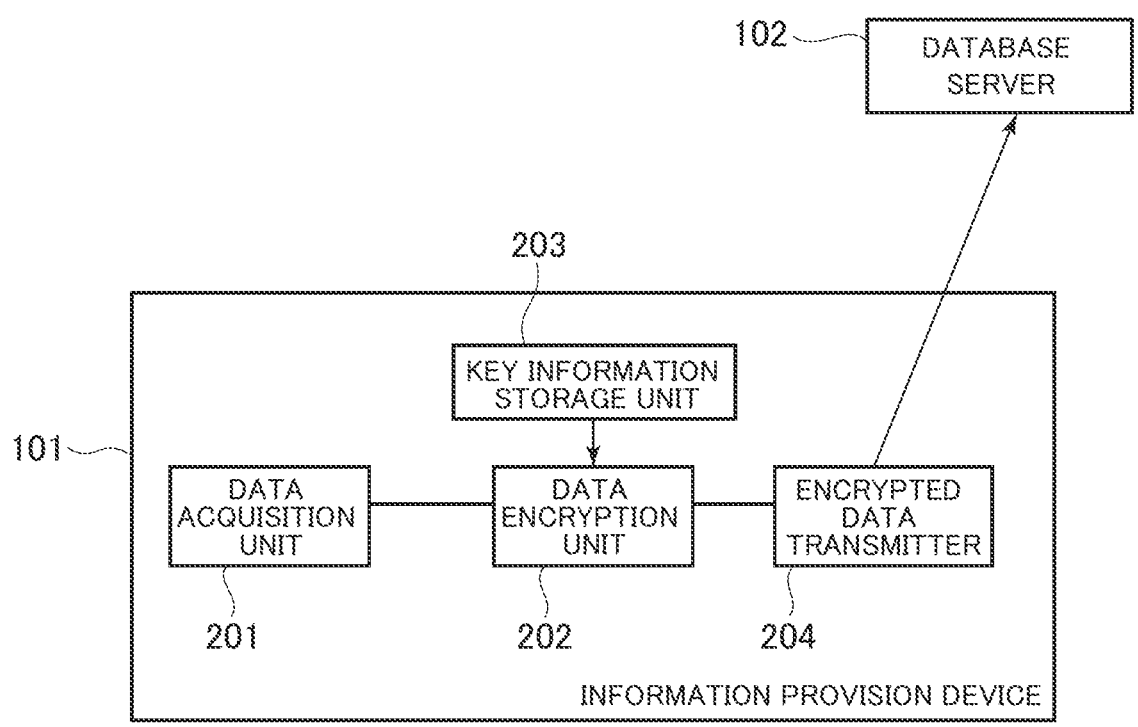
FIG. 2 is a function block diagram of an information provision device of the system according to the embodiment of the invention.

FIG. 2 illustrates a function block diagram of the information provision device 101. The information provision device includes a data acquisition unit 201, a data encryption unit 202, a key information storage unit 203, and an encrypted data transmitter 204. The information provision device 101 may be implemented by operating a program in a computer including a central processing unit (CPU), a memory, a storage device, an input/output device, and a bus connecting therebetween. In addition, the information provision device 101 may be implemented by combining hardware components such as large scale integration (LSI), so that it is unnecessary to use a program.

The data acquisition unit 201 acquires data. For example, data is read and acquired from an optical disc drive or a hard disk drive included in the information provision device 101. Alternatively, data is received and acquired from another device connected to the information provision device 101. For example, the acquired data is stored in a memory or a storage device of the information provision device 101.

The data acquired by the data acquisition unit 201 includes a plurality of elements. For example, with regard to a compound, a set of values indicating whether each of a plurality of predetermined partial structures is included corresponds to data. In this case, a value indicating whether the compound has a certain partial structure corresponds to an element. For example, a value indicating whether the compound has a methyl group corresponds to an element. Alternatively, a set of values indicating whether a general object (a person, a tangible object or an intangible object) has each of a plurality of attributes corresponds to data. In this case, a value indicating whether the object has a certain attribute corresponds to an element. For example, a value indicating whether the person is a female corresponds to an element. An integer value of 1 may be used as a value indicating that the compound has a partial structure or the object has an attribute, and an integer value of 0 may be used as a value indicating that the compound does not have a partial structure or the object does not have an attribute.

Since the data acquired by the data acquisition unit 201 includes a plurality of elements, the data acquisition unit 201 may be referred to as an "element acquisition unit 201".

The data encryption unit 202 performs an encryption process on the data acquired by the data acquisition unit 201. The data encryption unit 202 encrypts each of the plurality of elements included in the data using an encryption key stored in the key information storage unit 203. A common key of a common key cryptography, or a public key or a private key of a public key cryptography may be used as the encryption key. In the embodiment of the invention, it is preferable to use the public key of the user of the information provision device 101 in preparation for a case in which the encryption process for the query using the encryption key is needed in the database server 102. In addition, even when values of two elements are the same, it is preferable that results of the encryption process for the respective elements are not the same. For this reason, it is preferable to use a probabilistic encryption process.

The data encryption unit 202 may be referred to as an "element encryption unit 202".

The data encryption unit 202 may be implemented by, for example, reading the encryption key stored in the key information storage unit 203, storing the read encryption key, for example, in the memory of the information provision device 101, reading data acquired by the data acquisition unit 201 and stored in the memory or the storage device, and executing a program that causes the CPU to perform encryption. In addition, the data encryption unit 202 may be implemented by a combination of hardware without using the program. A result of the encryption process is stored in the memory or the storage device of the information provision device 101.

In the present embodiment, the encryption process preferably corresponds to a process in which a result obtained by applying first calculation to a value before the encryption process is a result obtained by decrypting a result, which is obtained by applying second calculation to a result of the encryption process. That is, the encryption process in the present embodiment preferably maintains semi-homomorphism between the first calculation and the second calculation.

For example, in a case in which the first calculation is set to sum calculation using "+", and the second calculation is set to product calculation using "*", the encryption process is represented by a function Enc, and a result obtained by applying the first calculation to a value before the encryption process is represented by a+b. In this instance, a result obtained by decrypting the result, which is obtained by applying the second calculation to the result of the encryption process, is $Enc^{-1}$ (Enc(a)*Enc(b)). Therefore, it is preferable to satisfy Enc(a+b)=Enc(a)*Enc(b).

For example, ElGamal encryption has been known as encryption maintaining semi-homomorphism between the first calculation and the second calculation. In ElGamal encryption, when an order of a certain group G is set to q, and a generator of G is set to g, a private key may be set to a number selected from integers having values greater than or equal to 0 and less than or equal to q−1. For example, the private key is set to x(0≤x≤q−1). In this instance, the public key may be set to $g^x$ (g to the power of x). The generator of G refers to an element g from which all elements of G may be obtained by generating a sequence of g to the powers $g^0$, $g^1$, $g^2$, $g^3$, ..., $g^{-1}$, $g^{-2}$, $g^{-3}$, .... The order q of G may be infinite. In this case, the private key may be selected from arbitrary integers.

When an object obtained by encoding plaintext m using the public key to associate the plaintext m with an element of the group G is represented as $s^m$ (for example, encoding is performed by setting s=g), a result Enc(m) of the encryption process corresponds to Enc(m)=($g^r$, $s^m*(g^x)^r$) by arbitrarily selected r (0≤r≤q−1). When r is selected to be different between individual plaintexts m, ElGamal encryption corresponds to probabilistic encryption.

In a case in which Enc(m)=($g^r$, $s^m*(g^x)^r$) is decrypted using a private key x, $c_2*(c_1^x)^{-1}$ may be calculated when $c_1=g^r$ and $c_2=s^m*(g^x)^r$ are set.

In addition, Enc(a)=($g^r$, $s^a*(g^x)^r$) and Enc(b)=($g^{r'}$, $s^b*(g^x)^{r'}$) are set to define Enc(a)*Enc(b) as below.

$$Enc(a)*Enc(b)=(g^r*g^{r'}, s^a*(g^x)^r*s^b*(g^x)^{r'})$$

(that is, (x, y)*(z, w)=(x*z, y*w) is defined)

In this instance, $$(g^{r}*g^{r'}, s^{a*}(g^{x})^{r}*s^{b*}(g^{x})^{r'})=(g^{r+r'}, s^{a+b}*(g^{x})^{r+r'})=Enc(a+b).$$

Therefore, Enc(a+b)=Enc(a)*Enc(b) is satisfied, and ElGamal encryption maintains semi-homomorphism between the first calculation "+" and the second calculation "*".

For example, Paillier encryption is known as another encryption method maintaining semi-homomorphism between the first calculation and the second calculation.

Figure 3:
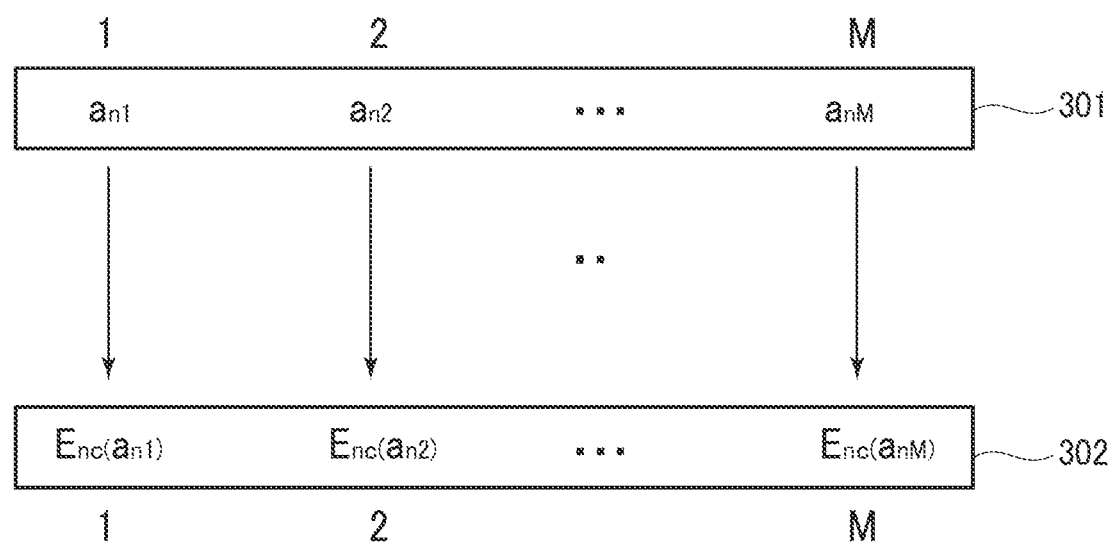
FIG. 3 is a diagram for description of an encryption process by the information provision device of the system according to the embodiment of the invention.

FIG. 3 is a diagram for description of an encryption process of the data encryption unit 202. It is presumed that reference symbol 301 represents n-th data including $a_{n1}$, $a_{n2}, \ldots, a_{nM}$ corresponding to M elements. A result obtained by encrypting the n-th data by the data encryption unit 202 is represented by reference symbol 302, and corresponds to M encrypted elements of $Enc(a_{n1}), Enc(a_{n2}), \ldots, Enc(a_{nM})$. Data including a plurality of encrypted elements is referred to as "encrypted vector data" or simply "encrypted vector".

The encrypted data transmitter 204 transmits data including the data encrypted by the data encryption unit 202 (encrypted vector data) to the database server 102. For example, the encrypted data transmitter 204 communicates with the database server 102 via a communication network to transmit the data including the encrypted vector data. Alternatively, the encrypted data transmitter 204 may transmit the data including the encrypted vector data to a recording device, the recording device may record the encrypted data in a recording medium, and the recording medium may be transported toward the database server 102.

The encrypted data transmitter 204 reads the result of the encryption process by the data encryption unit 202 stored in the memory or the storage device of the information provision device 101, transmits the result of the encryption process to the input/output device, and transmits the data encrypted by the data encryption unit 202.

The encrypted data transmitter 204 may be referred to as an "encrypted element transmitter 204".

Figure 4:
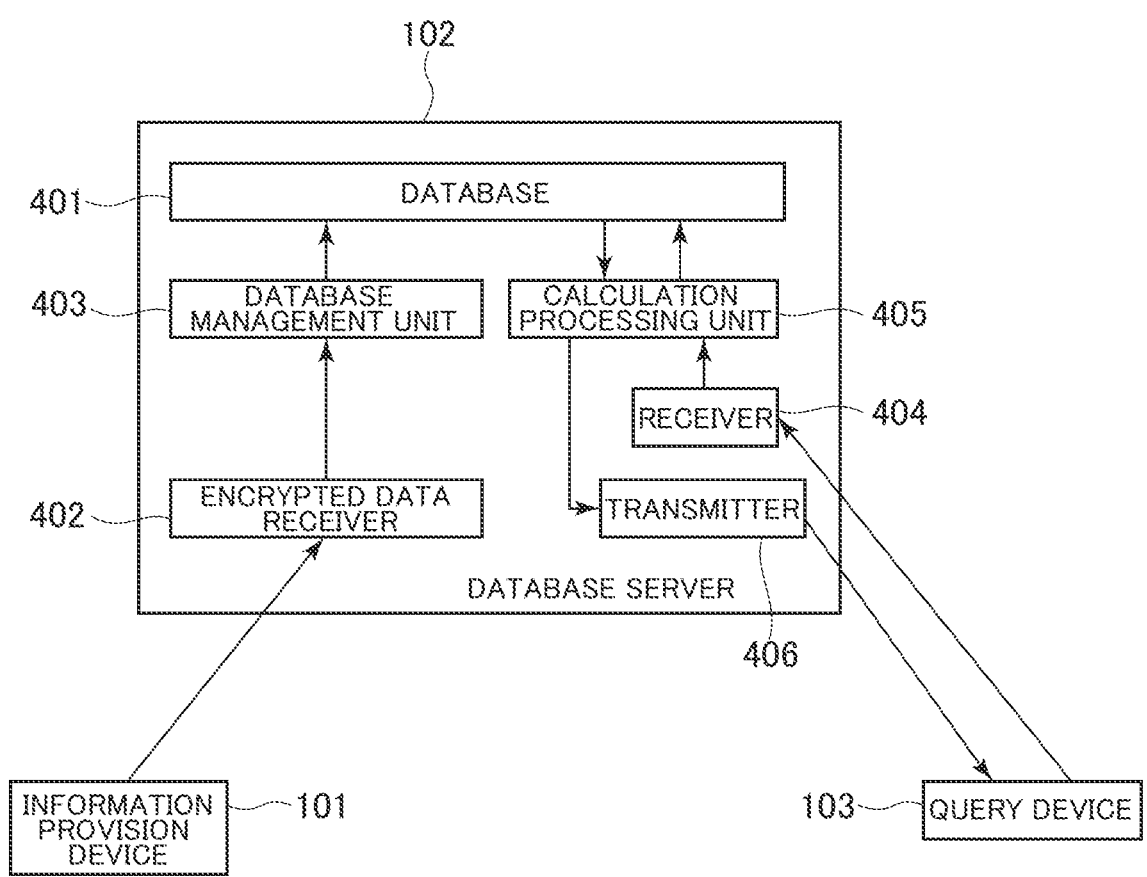
FIG. 4 is a function block diagram of a database server of the system according to the embodiment of the invention.

FIG. 4 illustrates a function block diagram of the database server 102. The database server 102 includes a database 401, an encrypted data receiver 402, a database management unit 403, a receiver 404, a calculation processing unit 405, and a transmitter 406. The database server 102 may be implemented by operating a program in a computer including a CPU, a memory, a storage device, an input/output device, and a bus connecting therebetween. In addition, the database server 102 may be implemented by combining hardware components such as LSI, so that it is unnecessary to use a program.

The database 401 stores one or a plurality of data items including the encrypted vector data transmitted from the information provision device 101. Therefore, the database 401 may store one or a plurality of encrypted vector data items. For example, the storage device of the database server 102 may store the data including the encrypted vector data.

FIG. 5 is an example diagram of a state in which N encrypted vector data items, each of which has M encrypted elements, are stored in the database 401. Numbers for uniquely identifying encrypted vector data are stored in a column 501, and the encrypted vector data is stored in a column 502. A table is formed by the column 501 and the column 502.

FIG. 6 is another example diagram of the state in which N encrypted vector data items, each of which has M encrypted elements, are stored in the database 401. FIG. 6 illustrates a table obtained by adding a column 601 to the table illustrated in FIG. 5. In this way, for example, $Enc(V_3)$ stored in the column 601 is associated with encrypted vector data of $Enc(a_{31}), Enc(a_{32}), \ldots, Enc(a_{3M})$. In this way, data stored in the column 601 may be included in a calculation result of a query against the database 401. In other words, when the query represents calculation of performing a search using the encrypted vector data stored in the column 502 as a key, a value stored in the column 601 and associated with the encrypted vector data may be included in a search result corresponding to a calculation result. In FIG. 6, data stored in the column 601 is data subjected to an encryption process. However, it is unnecessary for the data stored in the column 601 to be subjected to the encryption process.

The encrypted data receiver 402 receives data including the encrypted vector data transmitted by the encrypted data transmitter 204. For example, when the encrypted data transmitter 204 transmits data via a communication network, the encrypted data receiver 402 receives the data through an input/output device connected to the communication network. In addition, when data is stored in a recording medium by the encrypted data transmitter 204, the encrypted data receiver 402 receives the data from a reading device that reads the recording medium. The received data may be temporarily stored in a memory.

The database management unit 403 stores the data received by the encrypted data receiver 402 in the database 401. For example, data temporarily stored in the memory is read by the CPU and stored in the storage device. As a result, for example, the tables illustrated in FIG. 5 and FIG. 6 are stored in the database 401, and one or a plurality of encrypted vector data items is stored in the tables.

The receiver 404 receives a query from the query device 103. The query represents calculation to be performed on the encrypted vector data stored in the database 401. In the present embodiment, the query preferably corresponds to vector data having the same number of values as the number of elements of the encrypted vector data stored in the database 401. When the number of values included in the query is different from the number of elements of the encrypted vector data stored in the database 401, the number of values included in the query is preferably matched with the number of elements of the encrypted vector data stored in the database 401 by segmenting the query into a plurality of vector data items or performing padding of the values. Alternatively, when the number of values included in the query is different from the number of elements of the encrypted vector data stored in the database 401, this case may be regarded as an error. Hereinafter, when a query includes one or a plurality of vectors, an individual vector may be referred to as a "query vector" or "query vector data".

When the query device 103 transmits a query via a communication network, the receiver 404 receives the query through an input/output device connected to the communication network. Alternatively, the receiver 404 may receive the query from a reading device that reads a storage medium in which the query is recorded by the query device 103. The received query may be temporarily stored in a memory. In a process of the calculation processing unit 405, when a query vector is segmented into a plurality of segments, the receiver 404 may receive information about segmentation of the query vector. For example, the receiver 404 may receive information about the number of data items included in each segment (or a length of each segment or a segmentation position of a segment).

The calculation processing unit 405 performs calculation with respect to encrypted data stored in the database 401 in response to the query received by the receiver 404. When the database server 102 is implemented by the computer, a program that performs calculation with respect to the encrypted data in response to the query is read from the storage device to the memory, and the program is executed by the CPU. A calculation result is stored in the memory or the storage device of the computer that implements the database server 102.

Figure 7:
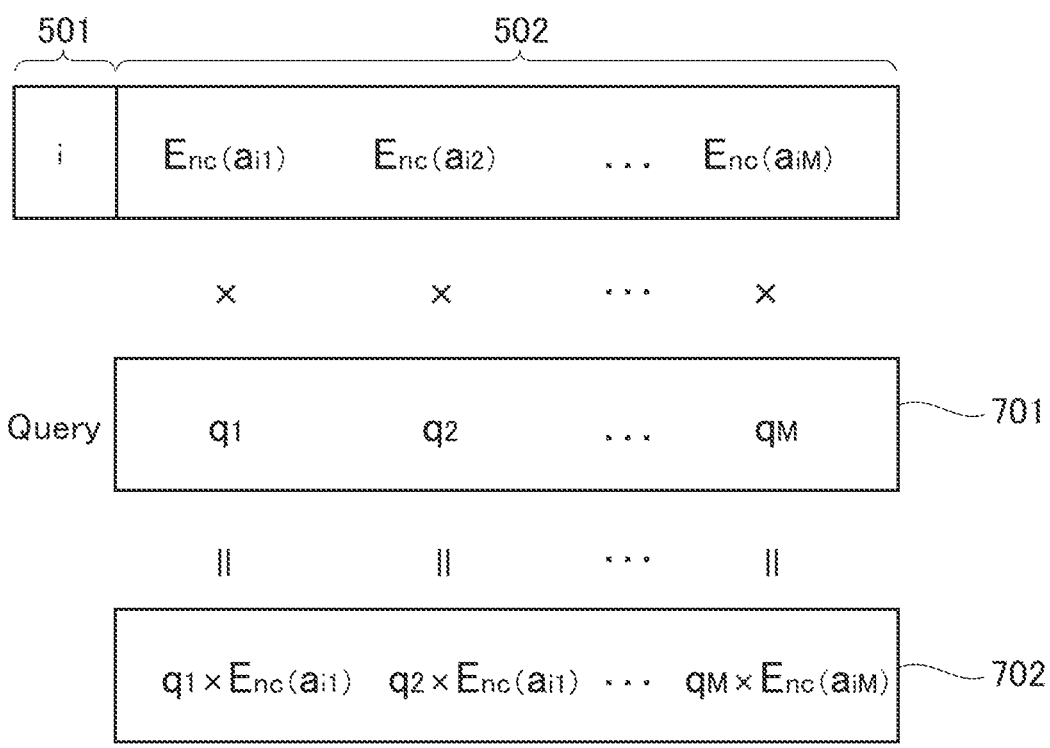
FIG. 7 is a diagram for description of calculation in the database server of the system according to the embodiment of the invention.

FIG. 7 is a diagram for description of calculation by the calculation processing unit 405. When encrypted vector data is stored in the database 401, and a query includes one or a plurality of vector data items (one or a plurality of query vectors), calculation performed by the calculation processing unit 405 basically corresponds to calculation of each of encrypted vector data items stored in the database 401 and each of query vector data items. In addition, when the vector data of the query is segmented into a plurality of segments, the encrypted vector data is similarly segmented into a plurality of segments, and it is possible to perform calculation of each of the query vectors of the query data and segments corresponding to the encrypted vector data. In this case, a sentence "the encrypted vector data is similarly segmented into a plurality of segments" means that a length of an i-th segment in a segment row of a plurality of segments of a query vector of a query is the same as a length of an i-th segment in a segment row of a plurality of segments of encrypted vector data. In addition, a sentence "calculation of each of query vector data items and a segment corresponding to the encrypted vector data is performed" means that a value of a product of elements of an i-th segment in a segment row of a plurality of segments of the query vector data and an i-th segment in a segment row of a plurality of segments of the encrypted vector data is calculated, and a product of the calculated values is calculated.

In FIG. 7, in a case in which one of query vector data items corresponds to $q_1, q_2, \ldots, q_M$ as indicated by reference symbol 701, when i-th vector data $Enc(a_{i1})$, $Enc(a_{i2})$, $\ldots$, $Enc(a_{iM})$ stored in the database 401 is read, the calculation processing unit 405 may calculate $(q_1*Enc(a_{i1}))*(q_2*Enc(a_{i2}))* \ldots *(q_M*Enc(a_{iM}))$. In addition, the calculation processing unit 405 may perform calculation using an arbitrary term selected from M terms of $q_1*Enc(a_{i1})$, $q_2*Enc(a_{i2})$, $\ldots$, $q_M*Enc(a_{iM})$. In particular, when $q_1, q_2, \ldots, q_M$ corresponds to 0 or 1, it is possible to calculate a product of arbitrary terms selected from $Enc(a_{i1})$, $Enc(a_{i2})$, $\ldots$, $Enc(a_{iM})$. Referring to a result of this calculation, a result of an encryption process with respect to a sum of arbitrary terms selected from $a_{i1}, a_{i2}, \ldots, a_{iM}$ may be calculated without performing a decryption process corresponding to Enc.

In addition, for example, since $Enc(a+b)=Enc(a)*Enc(b)$, and since $Enc(2a)=Enc(a+a)=Enc(a)*Enc(a)=Enc(a)^2$, $Enc(q_1a_{i1}+q_2a_{i2}+\ldots+q_Ma_{iM})=Enc(a_{i1})^{q_1}*Enc(a_{i2})^{q_2}* \ldots *Enc(a_{iM})^{q_M}$ is satisfied when $q_1, q_2, \ldots, q_M$ are integers. That is, a value $(Enc(q_1a_{i1}+q_2a_{i2}+\ldots+q_Ma_{iM}))$ obtained by encrypting an inner product (Euclidean metric) of $q_1, q_2, \ldots, q_M$ and $a_{i1}, a_{i2}, \ldots, a_{iM}$ may be calculated by applying an operation * to $Enc(a_{i1})$, $Enc(a_{i2})$, $\ldots$, $Enc(a_{iM})$ obtained by encrypting $a_{i1}, a_{i2}, \ldots, a_{iM}$, respectively.

In other words, it is possible to obtain a calculation result of encrypting (a sum of $q_j a_{ij}$) obtained by performing + operation with respect to respective elements of $a_{i1}, a_{i2}, \ldots, a_{iM}$ based on $q_1, q_2, \ldots, q_M$, by calculating an exponential value obtained by performing * operation based on $q_1, q_2, \ldots, q_M$ with respect to respective data items of encrypted vectors $Enc(a_{i1})$, $Enc(a_{i2})$, $\ldots$, $Enc(a_{iM})$, and an operation result by * with respect to a plurality of the exponential values. It is unnecessary to perform decryption when * operation is performed based on $q_1, q_2, \ldots, q_M$ with respect to respective data items of encrypted vectors $Enc(a_{i1})$, $Enc(a_{i2})$, $\ldots$, $Enc(a_{iM})$.

In addition, even though an example of calculation of Euclidean metric has been described above, Minkowski metric may be similarly calculated.

Here, it is presumed that all $a_{i1}, a_{i2}, \ldots, a_{iM}$ correspond to one of an integer 0 and an integer 1, and all $q_1, q_2, \ldots, q_M$ correspond to one of 0 and 1.

In this instance, for example, when all $q_1, q_2, \ldots, q_M$ correspond to 1, $(q_1*Enc(a_{i1}))*(q_2*Enc(a_{i2}))* \ldots *(q_M*Enc(a_{iM}))=Enc(a_{i1})*Enc(a_{i2})*Enc(a_{iM})=Enc(a_{i1}+a_{i2}+\ldots+a_{iM})$ is satisfied, and $a_{i1}+a_{i2}+\ldots+a_{iM}$ corresponds to the number of digits "1" in $a_{i1}, a_{i2}, \ldots, a_{iM}$. Thus, it is possible to calculate a value obtained by performing an encryption process on the number of digits "1" in $a_{i1}, a_{i2}, \ldots, a_{iM}$ without performing a decryption process of each of $Enc(a_{i1})$, $Enc(a_{i2})$, $\ldots$, $Enc(a_{iM})$.

Even though not all $q_1, q_2, \ldots, q_M$ correspond to 1,

[Formula 1]

$$\prod_{q_j=1} Enc(a_{ij}) = Enc\left(\sum_{q_j=1} a_{ij}\right) \qquad (1)$$

is satisfied, and thus it is possible to calculate a value obtained by encrypting the number of subscripts j with which both $q_j$ and $a_{ij}$ correspond to 1. A left side represents a calculation result by * of $Enc(a_{ij})$ with respect to j with which $q_j=1$ is satisfied. That is, when j with which $q_j=1$ is satisfied corresponds to 1, 3, and 4, the left side represents $Enc(a_{i1})*Enc(a_{i3})*Enc(a_{i4})$.

In this regard, when $a_{i1}, a_{i2}, \ldots, a_{iM}$ are denoted by A, and query vectors $q_1, q_2, \ldots, q_M$ are denoted by Q, various indices have been known as indices representing similarity between A and Q. For example, a Tversky Index calculated by a formula below has been known as one of such indices.

$$|A \cap Q|/(|A \cap Q|+\alpha(|A|-|A \cap Q|)+\beta(|Q|-|A \cap Q|))$$

Here, $|A \cap Q|$ corresponds to the number of subscripts j with which both $q_j$ and $a_{ij}$ correspond to 1, $|A|$ corresponds to the number of digits "1" in $a_{i1}, a_{i2}, \ldots, a_{iM}$, $|Q|$ corresponds to the number of digits "1" in $q_1, q_2, \ldots, q_M$, and each of $\alpha$ and $\beta$ corresponds to a positive number. In addition, each of $\alpha$ and $\beta$ may correspond to a positive integer or a rational number.

It is presumed that $\theta$ is a number greater than or equal to 0, and the Tversky Index is greater than or equal to $\theta$. That is, an formula of $$|A \cap Q|/(|A \cap Q|+\alpha(|A|-|A \cap Q|)+\beta(|Q|-|A \cap Q|)) \geq \theta$$

is obtained. When this formula is modified, it is possible to obtain $$\{1-\theta+\theta(\alpha+\beta)\}|A \cap Q|-\alpha\theta|A|-\beta\theta|Q| \geq 0 \qquad (2).$$

Here, when it is presumed that $\alpha', \beta', \theta'$, and $\theta_n$ are natural numbers satisfying $$\alpha=\alpha'/\theta_n, \beta=\beta'/\theta_n, \text{ and } \theta=\theta'/\theta_n$$

to replace the operation with an integer operation, Formula (2) may be deformed to Formula (3) below. A value corresponding to the Tversky Index may be calculated by Formula (3).

$$\gamma_1|A \cap Q|+\gamma_2|A|+\gamma_3|Q| \geq 0 \qquad (3)$$

where, $$\gamma_1 = \theta_n(\theta_n - \theta') + \theta'(\alpha' + \beta')$$

$$\gamma_2 = -\alpha'\theta'$$

$$\gamma_3 = -\beta'\theta'.$$

Therefore, when Formula (2) is satisfied, Formula (3) is satisfied.

Here, since $|A \cap Q|$ is the number of "i"s with which both an i-th element of A and an i-th element of Q correspond to 1, $Enc(|A \cap Q|)$ is calculated by $$\prod_{q_j=1} Enc(a_{ij}) \qquad \text{[Formula 2]}$$

from Formula (1). $Enc(|A|)$ is obtained by performing an encryption process on $a_{i1}+a_{i2}+\ldots+a_{iM}$, and thus is calculated by $$\prod_{j=1}^{M} Enc(a_{ij}) \qquad \text{[Formula 3]}$$

corresponding to a product of values obtained by performing an encryption process on each of $a_{i1}, a_{i2}, \ldots, a_{iM}$. $Enc(|Q|)$ is obtained by performing an encryption process on $q_1, q_2, \ldots, q_M$, and thus is calculated by $$\prod_{j=1}^{M} Enc(q_j) \qquad \text{[Formula 4]}$$

corresponding to a product of values obtained by performing an encryption process on each of $q_1, q_2, \ldots, q_M$. Here, when Enc corresponds to an encryption process by a public key, each of $Enc(|A \cap Q|)$, $Enc(|A|)$, and $Enc(|Q|)$ may be calculated without performing a decryption process and may be calculated in the database server 102. Therefore, a left side of Formula (3) may be calculated in the database server 102 by $$Enc(\gamma_1|A \cap Q| + \gamma_2|A| + \gamma_3|Q|) = Enc(|A \cap \Omega|)^{\gamma_1} * Enc(|A|)^{\gamma_2} * Enc(|Q|)^{\gamma_3}.$$

Even when Enc corresponds to an encryption process by a private key of the operator of the information provision device 101, the database server 102 may acquire $Enc(|Q|)$ by transmitting Q or the number of digits "1" in Q from the database server 102 to a device storing the private key of the operator of the information provision device 101, calculating $Enc(q_1+q_2+\ldots+q_M)$ in the device, and transmitting $Enc(q_1+q_2+\ldots+q_M)$ in reply.

Since a generator is set to g and an order is q in the group G, when the integer 0 is associated with an element $g^0$ (that is, an identity element) of the group G, a positive integer n is associated with $g^n$, and a negative integer m is associated with $g^{q+m}$, the left side of Formula (3) may be calculated by an operation in the group G, and an operation regarding whether Formula (3) is satisfied may be performed.

Hereinbefore, a description has been given of calculation using the query vectors $q_1, q_2, \ldots, q_M$ and the encrypted vector data items $Enc(a_{i1}), Enc(a_{i2}), \ldots, Enc(a_{iM})$. Further, it is possible to generalize the above-described calculation using a segment of the query vector and a segment of the encrypted vector data items to perform calculation using a partial vector of the query vectors and a partial vector of the encrypted vector data items. Here, a partial vector of vectors $v_1, v_2, \ldots, v_M$ refers to a vector obtained by selecting an element from $\{v_1, v_2, \ldots, v_M\}$ using an element of a subset of a set $\{1, 2, \ldots, M\}$ as a subscript. For example, when $M \geq 6$, $\{v_2, v_4, v_5\}$ is selected and set as a partial vector using elements of $\{2, 4, 6\}$ as subscripts.

In addition, the set $\{1, 2, \ldots, M\}$ may be split into a plurality of subsets, a plurality of calculations may be performed using a partial vector of the query vectors and a partial vector of the encrypted vector data items corresponding to each of the subsets, and a product of the plurality of calculated values may be calculated, thereby performing calculation of the query vectors and the encrypted vector data items.

For example, it is presumed that the query vectors $q_1, q_2, \ldots, q_M$ are segmented into a plurality of segments. For example, it is presumed that a row $u_1, u_2, \ldots, u_L$ of L numbers greater than 1 and less than M satisfying $1 < u_1 < u_2 < \ldots < u_L < M$ is given. The query vectors may be segmented into a plurality of segments by such a row of numbers. In more detail, the first segment of the query vectors may correspond to $q_1$ to $q_{u1}$, the second segment of the query vectors may correspond to $q_{u1+1}$ to $q_{u2}, \ldots,$ an (L+1)-th segment of the query vectors may correspond to $q_{uL+1}$ to $q_M$. In this case, it is possible to calculate an element-by-element product of a segment of the query vectors and a segment of the encrypted vector data items. In more detail, to correspond to splitting of the query into a plurality of segments, the encrypted vector data items $Enc(a_{i1}), Enc(a_{i2}), \ldots, Enc(a_{iM})$ are split such that the first segment of the encrypted vector data items corresponds to $Enc(a_{i1})$ to $Enc(a_{iu1})$, the second segment thereof corresponds to $Enc(a_{iu1+1})$ to $Enc(a_{iu2}), \ldots$ an (L+1)-th segment thereof corresponds to $Enc(a_{iuL+1})$ to $Enc(a_{iM})$. Then, L+1 product values of elements of an i-th segment of the query vectors and elements of an i-th segment of the encrypted vector data items ($1 \leq i \leq L+1$) may be used as a calculation result by the calculation processing unit 405.

The calculation processing unit 405 may generate a result of calculation of the respective query vectors and the respective encrypted vector data items stored in the database 401. Examples of the calculation include a product of corresponding elements of segments as described above. In addition, when a plurality of query vectors is received by the receiver 404, calculation is carried out to obtain a result of calculation on each of the plurality of query vectors and each of the encrypted vector data items stored in the database 401.

Examples of a case in which a plurality of query vectors is received by the receiver 404 include a case in which an obfuscation process of a query is performed in the query device 103 as described below. That is, the case corresponds to a case in which the query vectors are segmented into a plurality of segments, and segments are shuffled between the query and one or a plurality of random data vectors which includes random data having the same length as that of the query vectors and is segmented into a plurality of segments similarly to the query. In this case, shuffling is performed such that an i-th segment of the query corresponds to an i-th segment of the random data vectors. A plurality of vectors generated by segmenting the query vectors into N segments, and shuffling segments between the query and one or a plurality of random data vectors which includes random data having the same length as that of the query vectors and is segmented into a plurality of segments similarly to the query is referred to as N-randomized vectors. In addition, N may represent a sequence $u_1, u_2, \ldots, u_L$ satisfying $1 < u_1 < u_2 < \ldots < u_L < M$. In this instance, the above-described N-randomized vectors may be denoted by L+1-randomized vectors or $(u_1, u_2, \ldots, u_L)$-randomized vectors.

The transmitter 406 transmits the calculation result by the calculation processing unit 405. For example, when the database server 102 and the query device 103 are connected through a communication network, the transmitter 406 transmits the calculation result by the calculation processing unit 405 to the query device 103 through the communication network. Alternatively, the transmitter 406 may transmit the calculation result by the calculation processing unit 405 to a recording device that records the calculation result by the calculation processing unit 405 in a storage medium. The transmitter 406 reads the calculation result by the calculation processing unit 405 from the memory or the storage device and outputs the calculation result to the input device, thereby transmitting the calculation result.

Figure 8:
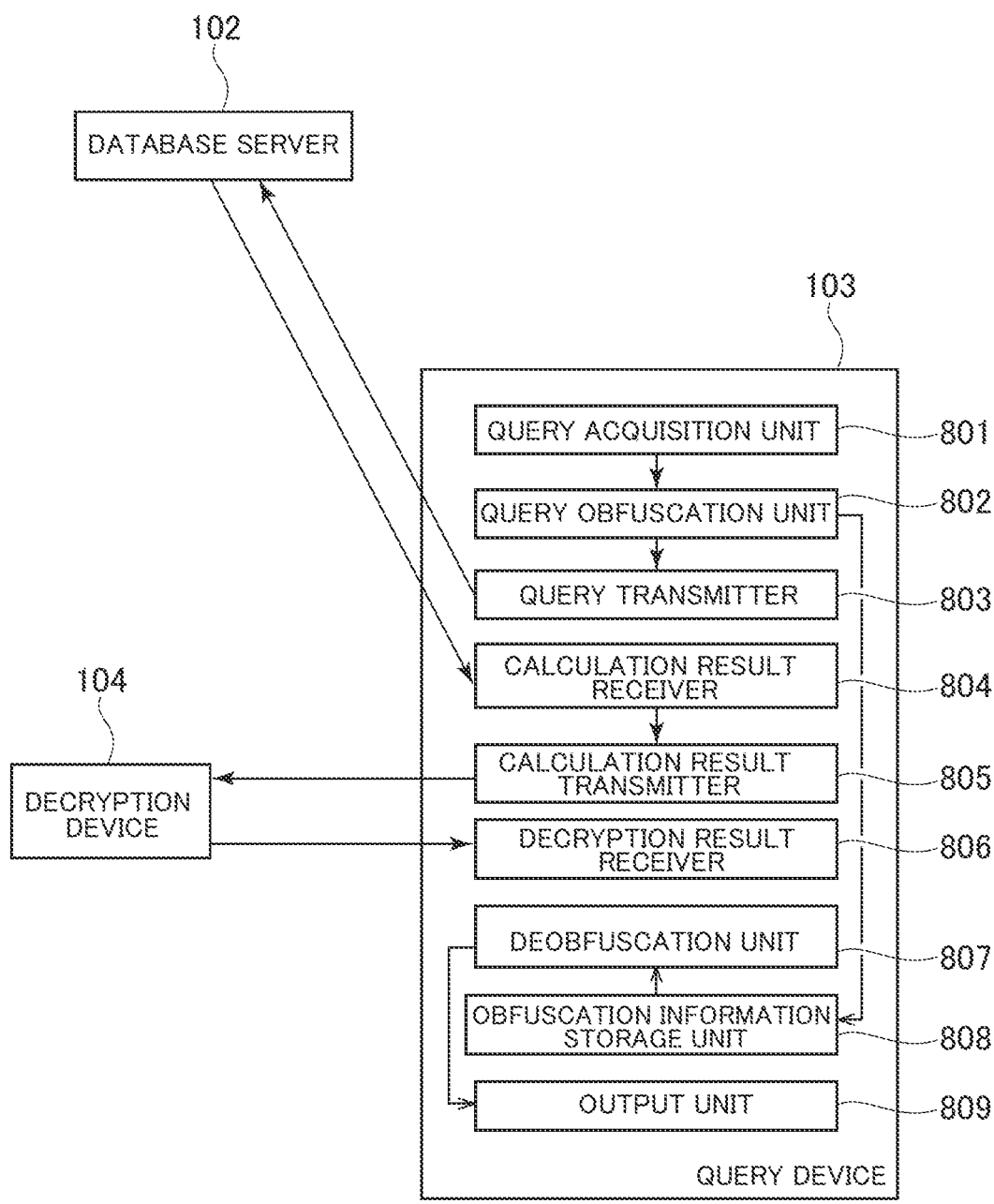
FIG. 8 is a function block diagram of a query device of the system according to the embodiment of the invention.

FIG. 8 illustrates a function block diagram of the query device 103. The query device 103 includes a query acquisition unit 801, a query obfuscation unit 802, a query transmitter 803, a calculation result receiver 804, a calculation result transmitter 805, a decryption result receiver 806, a deobfuscation unit 807, an obfuscation information storage unit 808, and an output unit 809. The query device 103 may be implemented by operating a program in a computer including a CPU, a memory, a storage device, an input/output device, and a bus connecting therebetween. Examples of a specific form of the query device 103 may include a personal computer, a smartphone, etc. In addition, the query device 103 may be implemented by combining hardware components such as LSI, so that it is unnecessary to use a program.

The query acquisition unit 801 acquires a query having a plurality of data items. For example, the query is acquired through a graphical user interface (GUI), etc. of the query device 103. Query vectors are obtained by the acquired query. That is, when a plurality of data items is acquired, query vectors are obtained by these data items. The obtained query vectors are stored in the memory or the storage device of the query device 103.

The query obfuscation unit 802 performs an obfuscation process of the query vectors. The obfuscation process of the query vectors may specifically mean the following processing.

(Step 1) A process of segmenting the query vectors into a plurality of segments is performed. For example, as described above, a row u1, u2, . . . , uL of L numbers less than or equal to M satisfying 1<u1<u2<. . . <uL<M is given, and the query vectors are segmented into L+1 segments.

(Step 2) A plurality of obfuscated query vectors is generated. One or a plurality of random data vectors which includes random data having the same length as that of the query vectors and is segmented into a plurality of segments similarly to the query vectors is prepared. Then, segments are shuffled between the random data vectors and the query vectors (an operation of exchanging a segment of the query vectors for a segment of the random data vectors is performed once or more). In this case, shuffling is performed such that an i-th segment of the query vectors corresponds to an i-th segment of the random data vectors.

A plurality of vectors obtained by the processing of (step 1) and (step 2) may be referred to as a plurality of "L+1-randomized vectors" or "(u1, u2, . . . , uL)-randomized vectors".

Through the obfuscation process of the query vectors, it is possible to segment the query vectors having a plurality of data items into a plurality of segments, and obtain a plurality of vectors including one or more of any one of the plurality of segments and a random segment having random data. In addition, the query vectors may be restored by selecting a segment other than the random segment from the plurality of vectors.

FIG. 9(A) to FIG. 9(D) are diagrams for description of generation of an obfuscated query (L+1-randomized vectors). As illustrated in FIG. 9(A), it is presumed that a query 901 including M elements $q_1, q_2, \ldots, q_M$ is acquired and stored in the memory or the storage device.

To correspond to the above-described process of step 1, the query 901 is segmented into L+1 segments $B_1$(911), $B_2$(912), . . . , $B_{L+1}$(913) as illustrated in FIG. 9(B).

To correspond to the above-described process of step 2, for example, the number of finally obtained obfuscated query vectors is set to 2, and the two obfuscated query vectors are indicated by reference symbol 931 and reference symbol 932 as in FIG. 9(C). In this case, in an initial step, for example, when reference symbol 931 denotes the query vectors, and reference symbol 932 denotes the random data vectors, segments are shuffled between the query vectors 931 and the random data vectors 932. For example, in FIG. 9(C), the first segment $B_1$ of the query vectors is exchanged for the first segment of the random data vectors (even though $B_2$ and $B_{L-1}$ are not exchanged for segments of the random data vectors 932 in FIG. 9(C), a segment selected from $B_3$, $B_4, \ldots, B_L$ may be exchanged for a segment of the random data vectors).

Through the obfuscation process, in FIG. 9(C), the first segment B1 (911) of the query vectors is disposed as the first segment of the obfuscated query vector 932, the second segment B2 (912) of the query vectors is disposed as the second segment of the obfuscated query vector 931, . . . , and the (L+1)-th segment of the query vectors is disposed an (L+1)-th segment of the obfuscated query vector 931. Further, a segment of the obfuscated query in which a segment of the query vectors is not disposed corresponds to a segment having a random value.

FIG. 9(D) is an example of information indicating a segment of an obfuscated query vector of a plurality of obfuscated query vectors as which each segment of the query vectors is disposed. In more detail, numbers of segments of the query vectors are stored in a column 951, and numbers of the obfuscated query vectors (an identifier of any one of a plurality of L+1-randomized vectors) are stored in a column 952. Such information is referred to as obfuscation information or generation information. The obfuscation information may include information about a length of each segment.

When the obfuscation process of the query vectors is performed by the query obfuscation unit 802, obfuscation information is generated, and the generated obfuscation information is stored in the obfuscation information storage unit 808. For example, the obfuscation information is stored in the memory or the storage device. In addition, in this instance, the obfuscation information may be stored in association with the query acquired by the query acquisition unit 801.

The query transmitter 803 transmits an obfuscated query obtained through obfuscation by the query obfuscation unit 802 to the database server 102. For example, the query transmitter 803 transmits the obfuscated query to the database server 102 through a communication network. Alternatively, the query transmitter 803 may transmit the obfuscated query to a device that performs writing to a recording medium, and the recording medium in which the obfuscated query is recorded may be sent to the database server 102. The query transmitter 803 may transmit information about a length of each segment. In addition, for example, when calculation related to a Tversky Index is performed in the database server 102, α', β', θ', θ$_n$, etc. may be transmitted as parameters.

In response to transmission of the obfuscated query by the query transmitter 803, the calculation result receiver 804 receives a calculation result from the database server 102. For example, the calculation result receiver 804 receives the calculation result through a communication network, and stores the received calculation result in the memory or the storage device. Alternatively, the calculation result is received from a device that reads a recording medium transmitted from the database server 102, and the received calculation result is stored in the memory or the storage device.

The calculation result transmitter 805 transmits a part of or all the calculation result received by the calculation result receiver 804 to the decryption device 104. The query device 103 has information about which segment of the obfuscated query corresponds to a segment of random data segments as obfuscation information, etc., and thus it is unnecessary to transmit a calculation result related to the segment of the random data segments to the decryption device 104. However, the calculation result related to the segment of the random data segments is preferably transmitted to the decryption device 104 in order to make it difficult for the decryption device 104 to determine what calculation has been performed from a result of decryption. The calculation result transmitter 805 transmits the calculation result through the communication network. Alternatively, the calculation result may be transmitted to a recording device that writes the calculation result to a recording medium, and the recording medium in which the calculation result is recorded may be transmitted to the decryption device 104.

The decryption result receiver 806 receives the decryption result transmitted from the decryption device 104. For example, the decryption result receiver 806 receives the decryption result through the communication network. Alternatively, the decryption result is received from a device that reads a recording medium in which the decryption result is recorded. The received decryption result is stored in the memory or the storage device.

In the case of transmitting the calculation result by the calculation result transmitter 805 or receiving the decryption result by the decryption result receiver 806 through the communication network, when the query device 103 and the decryption device 104 directly communicate with each other, the decryption device 104 may obtain an Internet protocol (IP) address of the query device 103. In this way, it is possible to detect an organization to which the query device 103 belongs. To prevent such circumstances, communication between the query device 103 and the decryption device 104 is preferably performed through another server such that information of the query device 103 is not known to the decryption device 104. For example, communication between the query device 103 and the decryption device 104 may be performed through the database server 102.

The deobfuscation unit 807 performs a deobfuscation process on the decryption result received by the decryption result receiver 806 using the obfuscation information stored in the obfuscation information storage unit 808.

That is, a calculation result with respect to each segment from each of the obfuscated query vectors is received from the database server 102 and transmitted to the decryption device 104. A result of decryption with respect to a segment of the random data vectors may be removed from a result of decryption received from the decryption device 104 with reference to the obfuscation information, and a calculation result with respect to each segment of the query vectors may be obtained.

For example, it is presumed that query vectors with which all data items of a query correspond to 1 are segmented into a plurality of segments $B_1, B_2, \ldots, B_{L+1}$. When $\text{Enc}(b_1), \text{Enc}(b_2), \ldots, \text{Enc}(b_{L+1})$ are obtained as a calculation result with respect to each of the plurality of segments by the database server 102, it is possible to obtain $b_1, b_2, \ldots, b_{L+1}$ by transmitting $\text{Enc}(b_1), \text{Enc}(b_2), \ldots, \text{Enc}(b_{L+1})$ to the decryption device 104 to decrypt $\text{Enc}(b_1), \text{Enc}(b_2), \ldots, \text{Enc}(b_{L+1})$, and it is possible to obtain information related to the number of digits "1" in respective segments of data before encryption of encrypted vector data. Even when $\text{Enc}(b_1)*\text{Enc}(b_2)* \ldots *\text{Enc}(b_{L+1})$ is calculated and a calculation result thereof is transmitted to the decryption device 104 instead of transmitting each of $\text{Enc}(b_1), \text{Enc}(b_2), \ldots, \text{Enc}(b_{L+1})$ to the decryption device 104, it is possible to obtain information related to the number of digits "1" in respective segments of data before the encryption process on encrypted vector data.

Similarly, it is possible to obtain information related to a Tversky Index of query data and data before encryption of encrypted vector data. In addition, as described above, it is possible to obtain information related to Euclidean metric or Minkowski metric.

The output unit 809 outputs a result of processing of the deobfuscation unit 807. For example, a result of processing of the deobfuscation unit 807 is displayed on a display of the query device 103.

Figure 10:
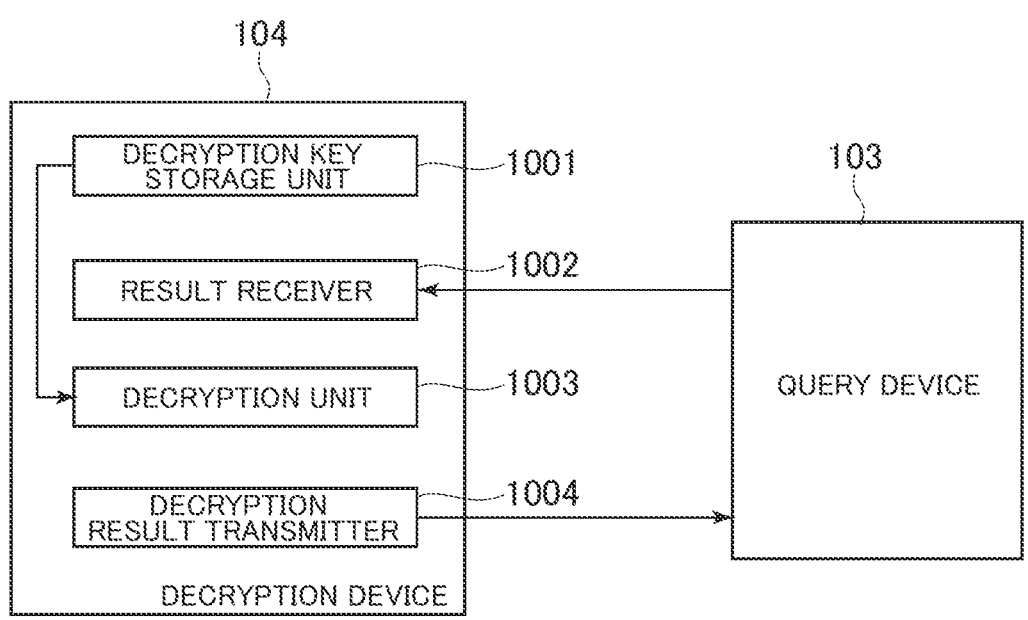
FIG. 10 is a function block diagram of a decryption device of the system according to the embodiment of the invention.

FIG. 10 illustrates a function block diagram of the decryption device 104. The decryption device includes a decryption key storage unit 1001, a result receiver 1002, a decryption unit 1003, and a decryption result transmitter 1004. The decryption device 104 may be implemented by operating a program in a computer including a CPU, a memory, a storage device, an input/output device, and a bus connecting therebetween. In addition, the decryption device 104 may be implemented by combining hardware components such as LSI, so that it is unnecessary to use a program. In addition, the decryption device 104 and the information provision device 101 may be used as one device.

The decryption key storage unit 1001 stores a decryption key. For example, the decryption key is stored in the memory or the storage device. The decryption key is a key for performing a decryption process corresponding to the encryption process by the data encryption unit 202 of the information provision device 101. When a public key is used in the encryption process by the data encryption unit 202 of the information provision device 101, the decryption key is a private key corresponding to the public key.

The result receiver 1002 receives the calculation result transmitted from the database server 102 by the query device 103. For example, the result receiver 1002 receives the calculation result through a communication network, and stores the received calculation result in the memory or the storage device.

The decryption unit 1003 executes the decryption process on the calculation result received by the result receiver 1002 using the decryption key stored in the decryption key storage unit 1001. A decryption result corresponding to a result obtained by executing the decryption process is stored in the memory or the storage device.

The decryption result transmitter 1004 transmits a result of decryption by the decryption unit 1003 to the query device. For example, the decryption result transmitter 1004 transmits the decryption result through the communication network.

Figure 11:
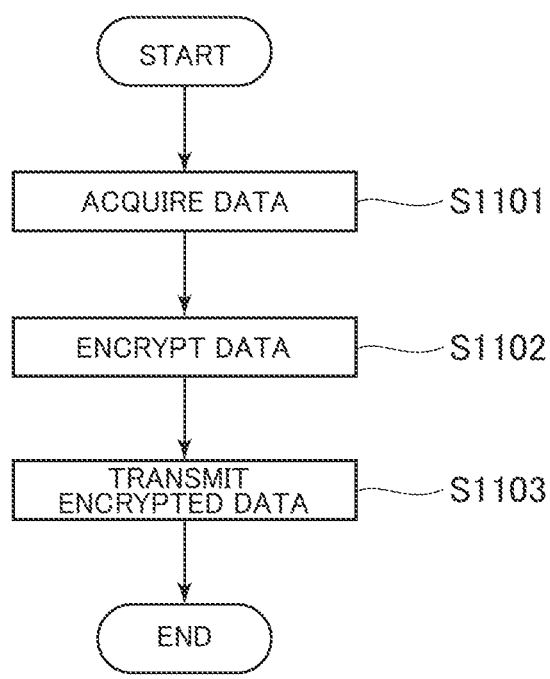
FIG. 11 is a flowchart of a process executed by the information provision device of the system according to the embodiment of the invention.

FIG. 11 is an example of a flowchart of processing of the information provision device 101. As processing of step S1101, data is acquired by operating the data acquisition unit 201. As processing of step S1102, data is encrypted to generate encrypted vector data by operating the data encryption unit 202. As processing of step S1103, the encrypted vector data is transmitted by operating the encrypted data transmitter 204.

Figure 12:
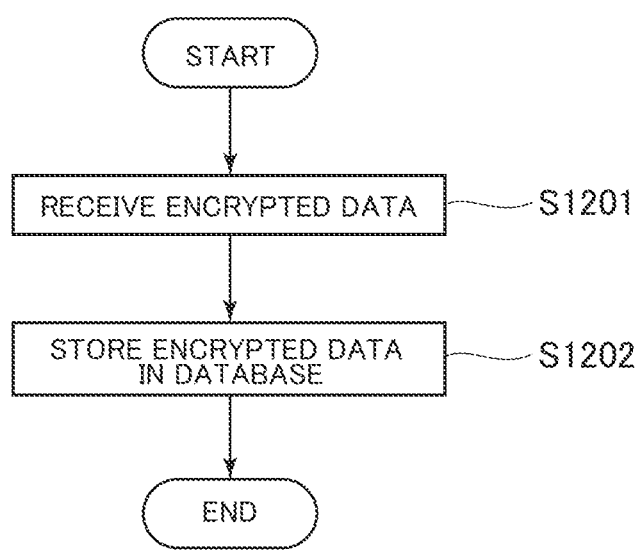
FIG. 12 is a flowchart of a process executed by the database server of the system according to the embodiment of the invention.

FIG. 12 is a flowchart of processing until the database server 102 receives the encrypted vector data and stores the encrypted vector data in the database 401. As processing of step S1201, the encrypted vector data is received by operating the encrypted data receiver 402. As processing of step S1202, the encrypted data is stored in the database 401 by operating the database management unit 403.

Figure 13:
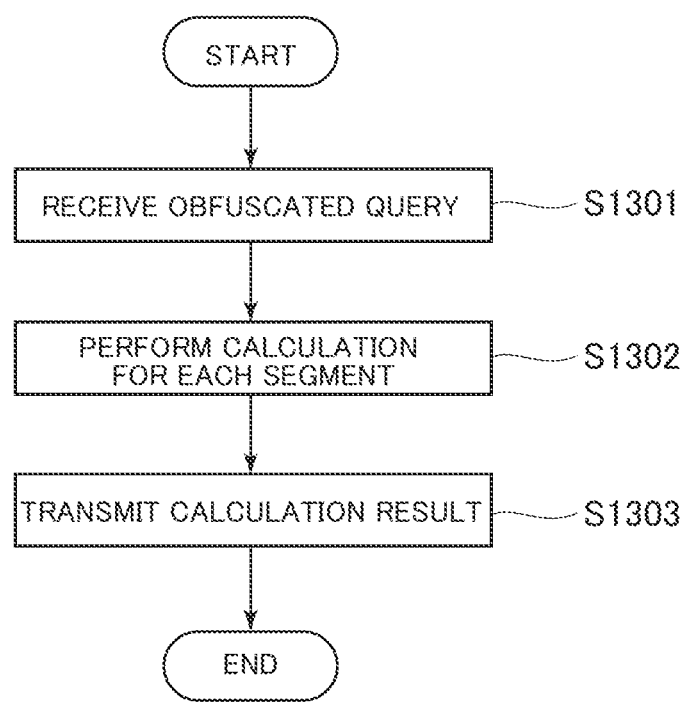
FIG. 13 is a flowchart of a process executed by the database server of the system according to the embodiment of the invention.

FIG. 13 is a flowchart of processing until the database server 102 transmits the calculation result after receiving the obfuscated query. As processing of step S1301, the obfuscated query is received by operating the receiver 404. As processing of step S1302, calculation is performed for each segment of vectors of the obfuscated query by operating the calculation processing unit 405. As processing of step S1303, a calculation result is transmitted by operating the transmitter 406.

Figure 14:
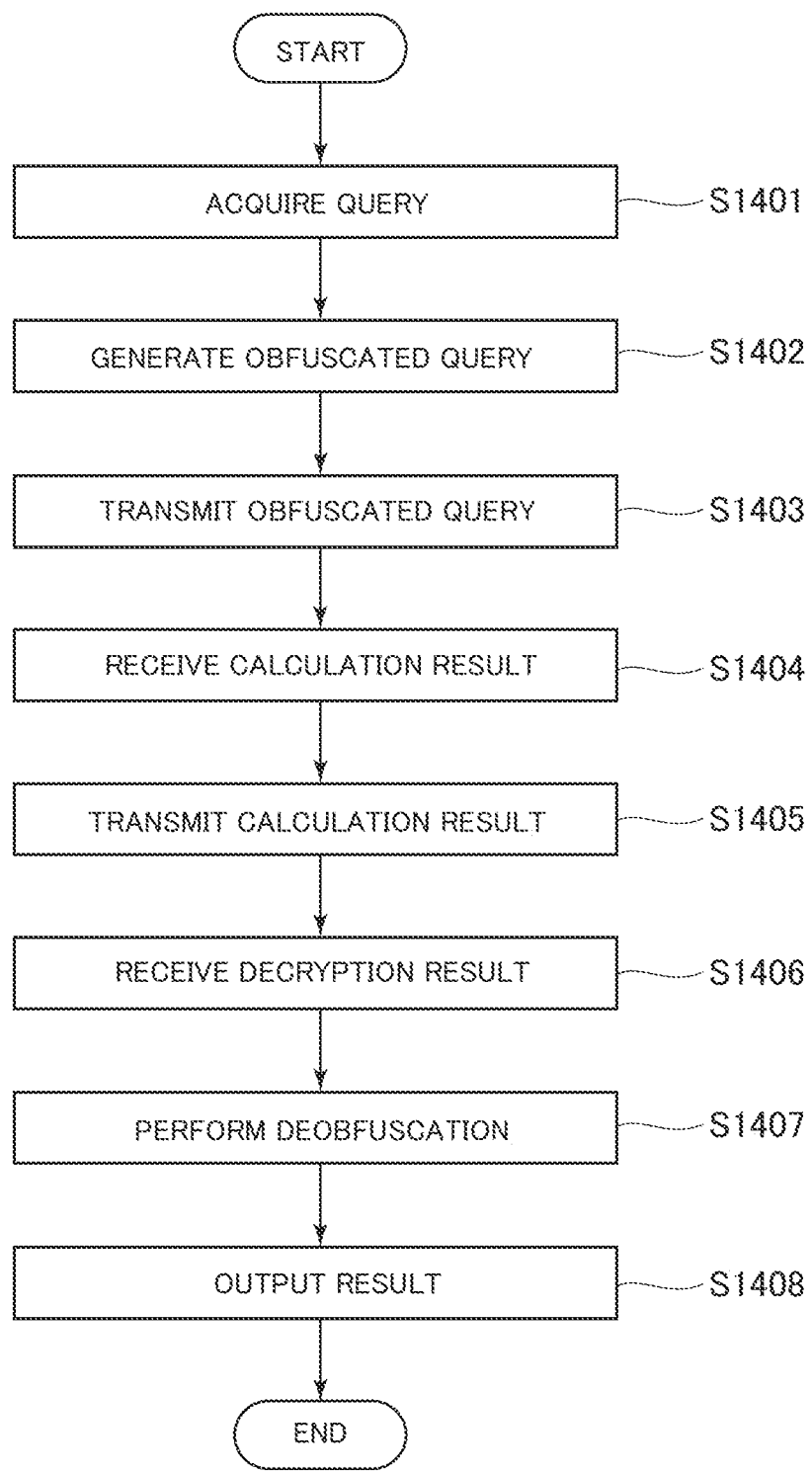
FIG. 14 is a flowchart of a process executed by the query device (terminal device) of the system according to the embodiment of the invention.

FIG. 14 is a flowchart for description of processing of the query device 103. As processing of step S1401, a query is acquired by operating the query acquisition unit 801. As processing of step S1402, an obfuscated query is generated by operating the query obfuscation unit 802. In this instance, obfuscation information is stored in the obfuscation information storage unit 808. As processing of step S1403, the obfuscated query is transmitted by operating the query transmitter 803. As processing of step S1404, a calculation result is acquired by operating the calculation result receiver 804. As processing of step S1405, the calculating result is transmitted by operating the calculation result transmitter 805. As processing of step S1406, a result of a decryption process is received by operating the decryption result receiver 806. As processing of step S1407, a deobfuscation process is performed by operating the deobfuscation unit 807. As processing of step S1408, the result of deobfuscation process is output by operating the output unit 809.

Figure 15:
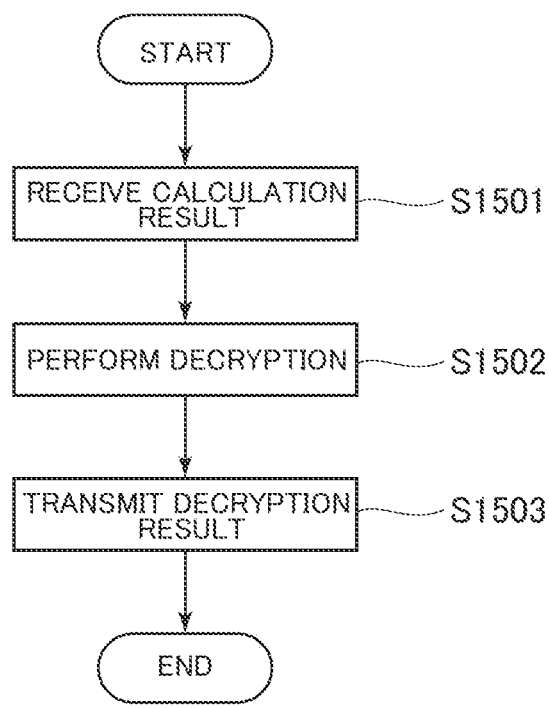
FIG. 15 is a flowchart of a process executed by the decryption device of the system according to the embodiment of the invention.

FIG. 15 is a flowchart for description of processing of the decryption device 104. As processing of step S1501, the calculation result is received by operating the result receiver 1002. As processing of step S1502, a decryption process is performed by operating the decryption unit 1003. As processing of step S1503, a result of the decryption process is transmitted by operating the decryption result transmitter 1004.

Figure 16:
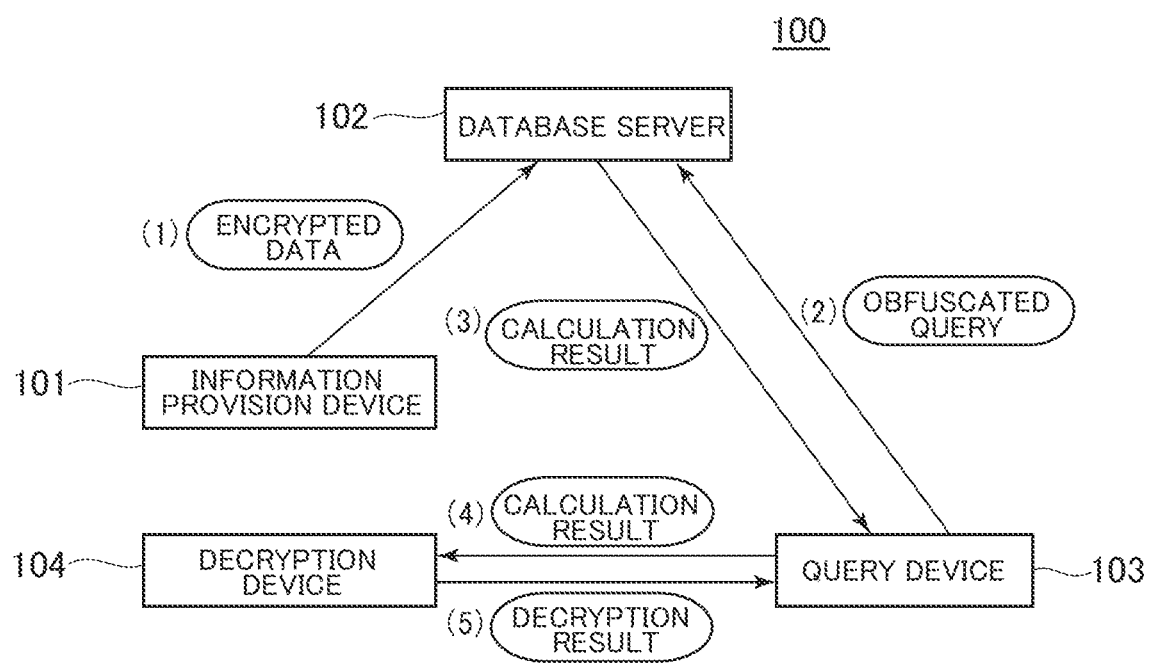
FIG. 16 is a diagram for description of a flow of data of the system according to the embodiment of the invention.

FIG. 16 is a diagram for description of a flow of data of the system according to the embodiment of the invention.

(Step 1) Encrypted vector data is transmitted from the information provision device 101 to the database server 102, and is stored in the database 401 of the database server 102. Transmission of encrypted data is frequently performed as appropriate. In addition, the encrypted data stored in the database 401 may be deleted or changed as appropriate.

(Step 2) Obfuscated query is transmitted from the query device 103 to the database server 102. When the database server 102 receives the obfuscated query, calculation is performed for each segment of the obfuscated query.

(Step 3) A calculation result is transmitted from the database server 102 to the query device 103.

(Step 4) The calculation result received in step 3 is transmitted from the query device 103 to the decryption device 104.

(Step 5) A decryption process is performed in the decryption device 104, and a decryption result is transmitted to the query device 103.

Figure 17:
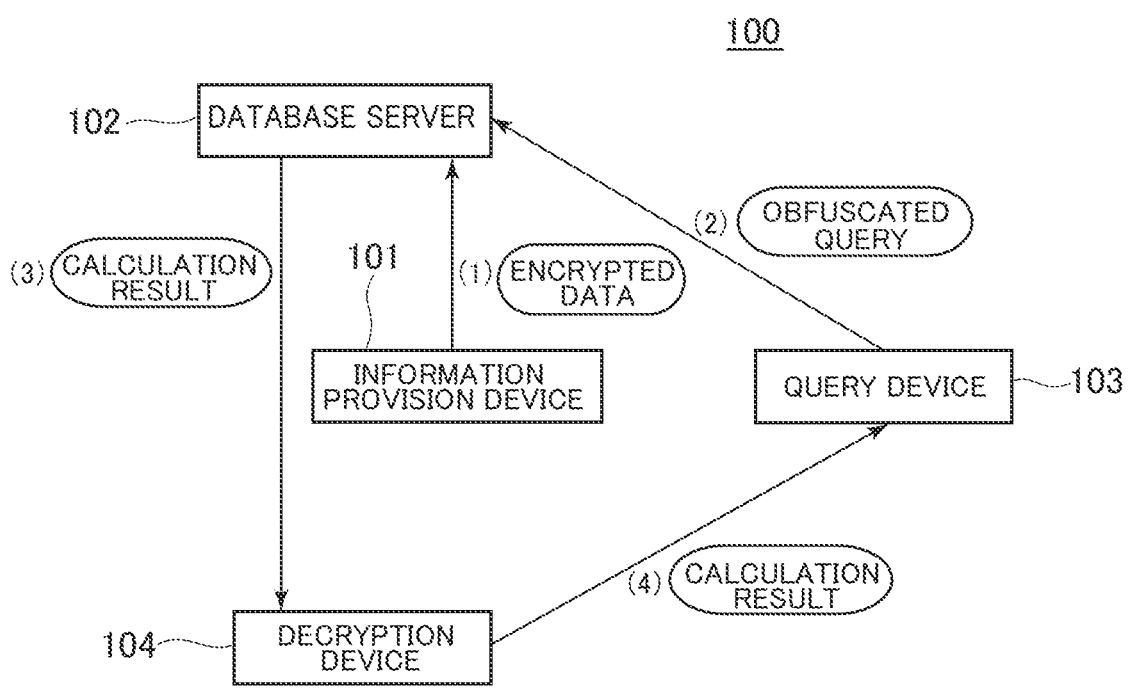
FIG. 17 is a diagram for description of a flow of data of the system according to the embodiment of the invention.

FIG. 17 illustrates a flow of data different from FIG. 16 in the embodiment of the invention.

In FIG. 17, step 1 to step 2 are similar to FIG. 16. Steps from step 3 are different from the flow of data of FIG. 16.

(Step 3) A calculation result is transmitted from the database server 102 to the decryption device 104.

(Step 4) In the decryption device 104, a decryption process for the calculation result is performed, and a decryption result is transmitted to the query device 103.

As described above, as the present embodiment, in the database server, the encrypted vector data is stored, the obfuscated query is received from the query device 103, calculation with respect to a segment of vectors of the obfuscated query is performed, and transmission to the query device 103 is performed in reply. In this way, in the query device 103, it is possible to obtain a calculation result subjected to the encryption process, and to obtain a result of the decryption process without others knowing an object of calculation in the database server.

In the above description, it has been assumed that one information provision device 101, one database server 102, one query device 103, and one decryption device 104 are provided. However, the invention is not restricted thereto. An arbitrary number of information provision devices 101, an arbitrary number of database servers 102, an arbitrary number of query devices 103, and an arbitrary number of decryption devices 104 may be provided.

Figure 18:
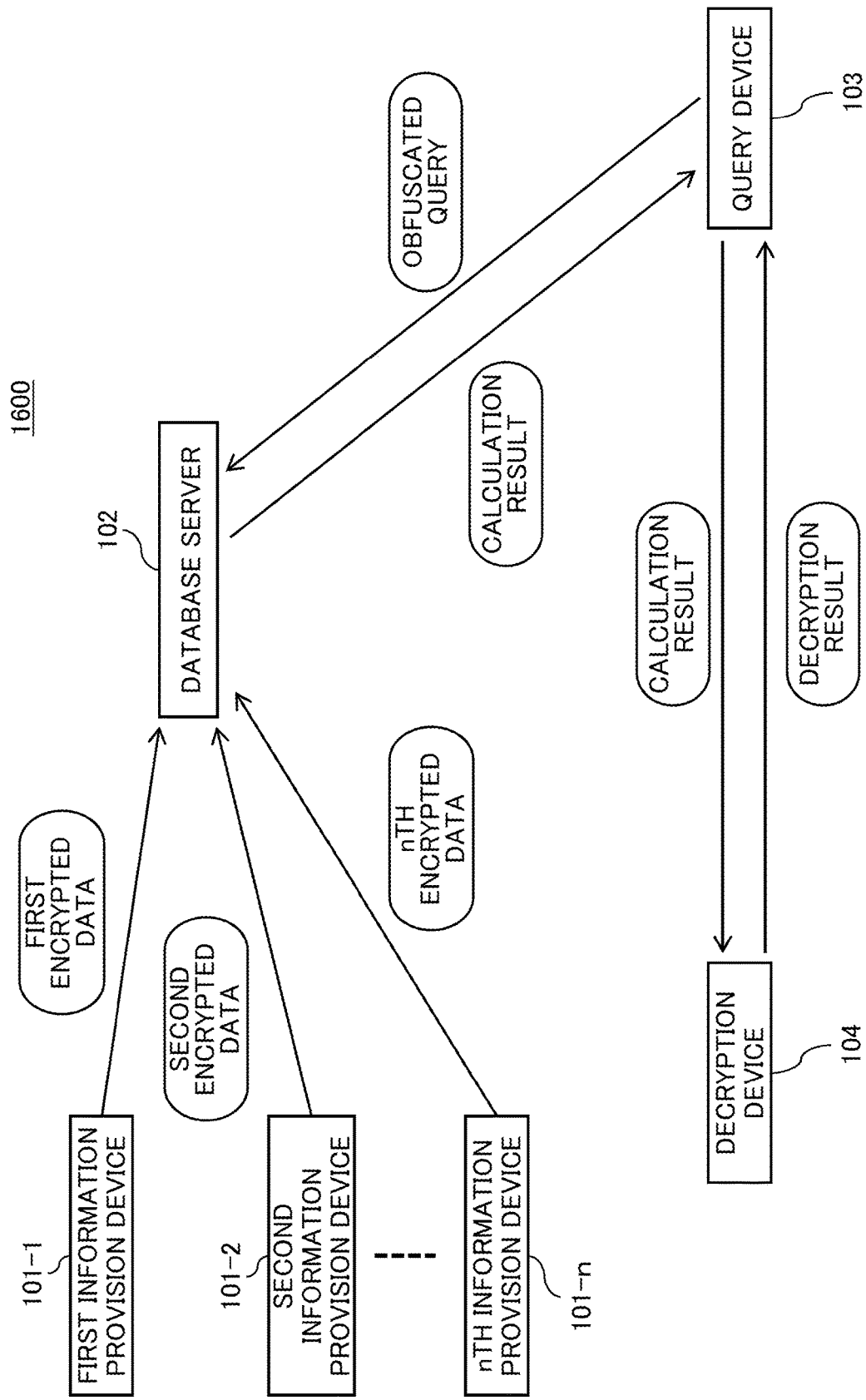
FIG. 18 is a diagram for description of a flow of data of the system according to the embodiment of the invention.

For example, FIG. 18 illustrates an example of a system 1600 corresponding to a case in which a plurality of information provision devices is provided in FIG. 16. In more detail, each of the first information provision device 101-1, the second information provision device 101-2, . . . , the n-th information provision device 101-*n* is configured similarly to the information provision device 101, and the database server 102 receives first encrypted data, second encrypted data, . . . , n-th encrypted data from the first information provision device 101-1, the second information provision device 101-2, . . . , the n-th information provision device 101-*n*, respectively. In FIG. 18, the first encrypted data, the second encrypted data, . . . , the n-th encrypted data indicate encrypted vector data received by the database server 102 from the first information provision device 101-1, the second information provision device 101-2, . . . , the n-th information provision device 101-*n*. In particular, the number of first encrypted data items, the number of second encrypted data items, . . . , the number of n-th encrypted data items are not restricted to 1, and may be set to an arbitrary number.

In FIG. 18, the same encryption key may be stored in key information storage units 203 of the first information provision device 101-1, the second information provision device 101-2, . . . , the n-th information provision device 101-*n*. That is, the first information provision device 101-1, the second information provision device 101-2, . . . , the n-th information provision device 101-*n* may share a common public key. Therefore, the first encrypted data, the second encrypted data, . . . , the n-th encrypted data may correspond to encrypted vector data obtained by being encrypted using the same encryption key.

In addition, in FIG. 18, the decryption device 104 stores a key for performing a decryption process corresponding to an encryption process by the encryption key stored in the key information storage units 203 of the first information provision device 101-1, the second information provision device 101-2, ..., the n-th information provision device 101-n.

Therefore, in FIG. 18, the database server 102 receives encrypted data encrypted using the same encryption key from each of the first information provision device 101-1, the second information provision device 101-2, ..., the n-th information provision device 101-n, and stores the received encrypted data in the database 401. In addition, the query device 103 transmits an obfuscated query to the database server 102, and the database server 102 transmits a calculation result with respect to the obfuscated query to the query device 103 in reply. The query device 103 transmits a calculation result to the decryption device 104, and the decryption device 104 transmits a decryption result in reply. The query device 103 may perform a deobfuscation on the decryption result transmitted in reply, thereby obtaining a result with respect to the query.

When the system 1600 is configured in this way, processing of data provided by operators of a plurality of information provision devices may be performed without the operator of the database server 102 and the operator of the decryption device 104 knowing content of a query. In addition, it is possible to make it difficult for the operator of the database server 102 and the user of the query device 103 to know content of individual data items provided by the operators of the information provision devices.

For example, it is presumed that the respective operators of the plurality of information provision devices correspond to article purchase organizations, and data provided by the article purchase organizations includes the number of articles desired to be purchased. Further, it is presumed that the operator of the query device is an article providing organization. In this instance, the article providing organization may know the total number of articles desired to be purchased by the respective article purchase organizations. However, it is difficult for the operator of the database server 102 and the article providing organization to know the number of articles desired to be purchased by each of the article purchase organizations.

For example, the above configuration may be applied when a company issues shares. That is, each investor encrypts the number of shares desired to be purchased using the same encryption key and transmits the number to a database server. For example, the database server is managed by a securities company. In this instance, the company that issues shares may know the total number of shares desired to be purchased by investors for the database server, and has difficulty in knowing the number of shares desired to be purchased by an individual investor.

(Second Embodiment)

Figure 19:
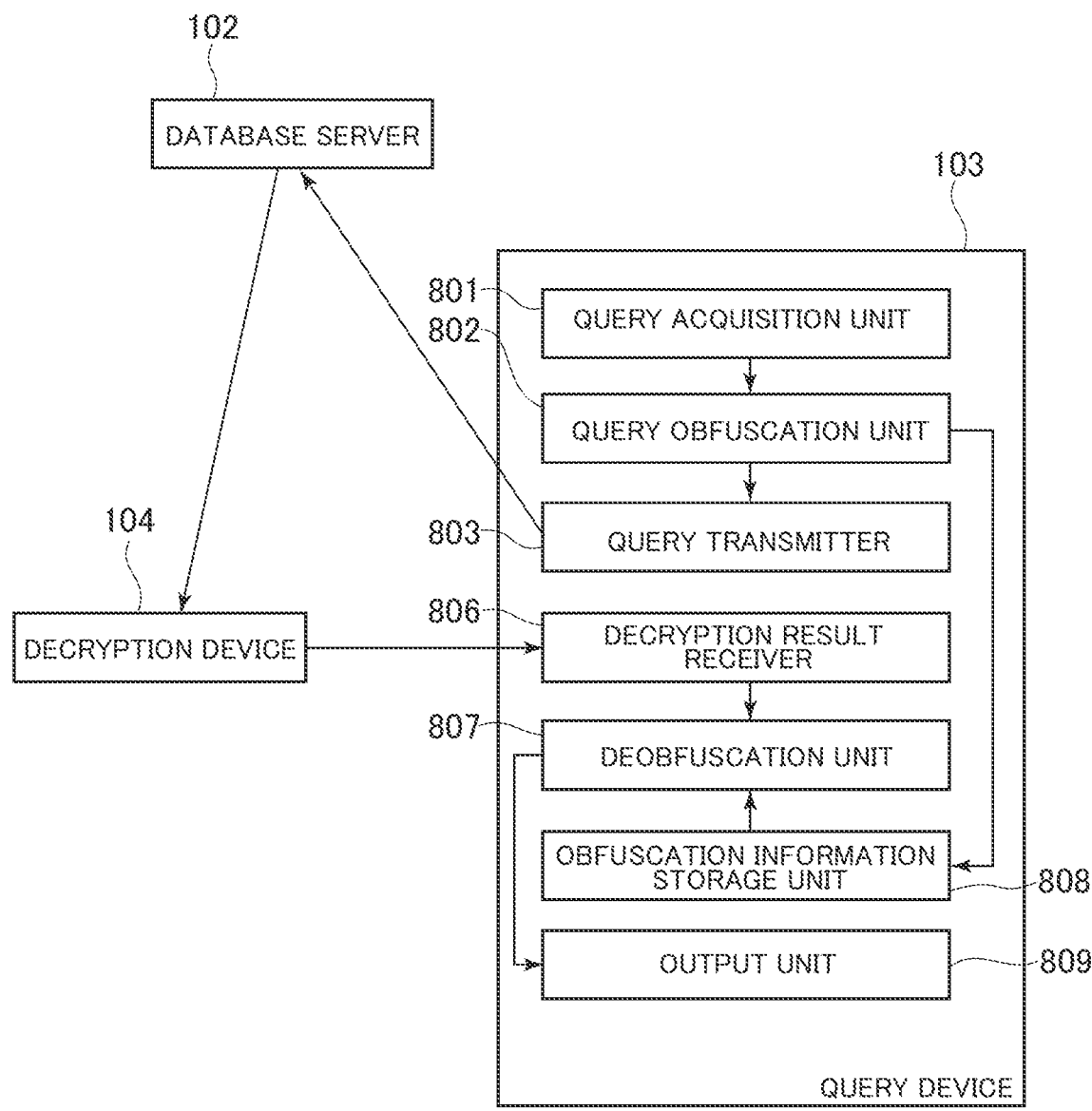
FIG. 19 is a function block diagram of a system according to an embodiment of the invention.

FIG. 19 illustrates a function block diagram of a query device 103 when the flow of data illustrated in FIG. 17 is implemented. As illustrated in FIG. 19, the query device 103 includes a query acquisition unit 801, a query obfuscation unit 802, a query transmitter 803, a decryption result receiver 806, a deobfuscation unit 807, an obfuscation information storage unit 808, and an output unit 809.

Each of the query acquisition unit 801, the query obfuscation unit 802, the query transmitter 803, the decryption result receiver 806, the deobfuscation unit 807, the obfuscation information storage unit 808, and the output unit 809 is the same as that of the query device 103 described with reference to FIG. 8.

In FIG. 19, a calculation result by the calculation processing unit 405 of the database server 102 is directly transmitted to the result receiver 1002 of the decryption device 104 by the transmitter 406 of the database server 102. For this reason, it is unnecessary for the query device 103 to include the calculation result receiver 804 and the calculation result transmitter 805 illustrated in FIG. 8.

The flow of data illustrated in FIG. 17 and a configuration illustrated in FIG. 19 eliminate the need for the query device 103 to perform a process of receiving the calculation result from the database server 102 and transmitting the calculation result to the decryption device 104.

In FIG. 19, a decryption result is directly transmitted from the decryption device 104 to the query device 103. However, the decryption result may be transmitted from the decryption device 104 to the query device 103 through another server such as the database server 102.

(Third Embodiment)

Figure 20:
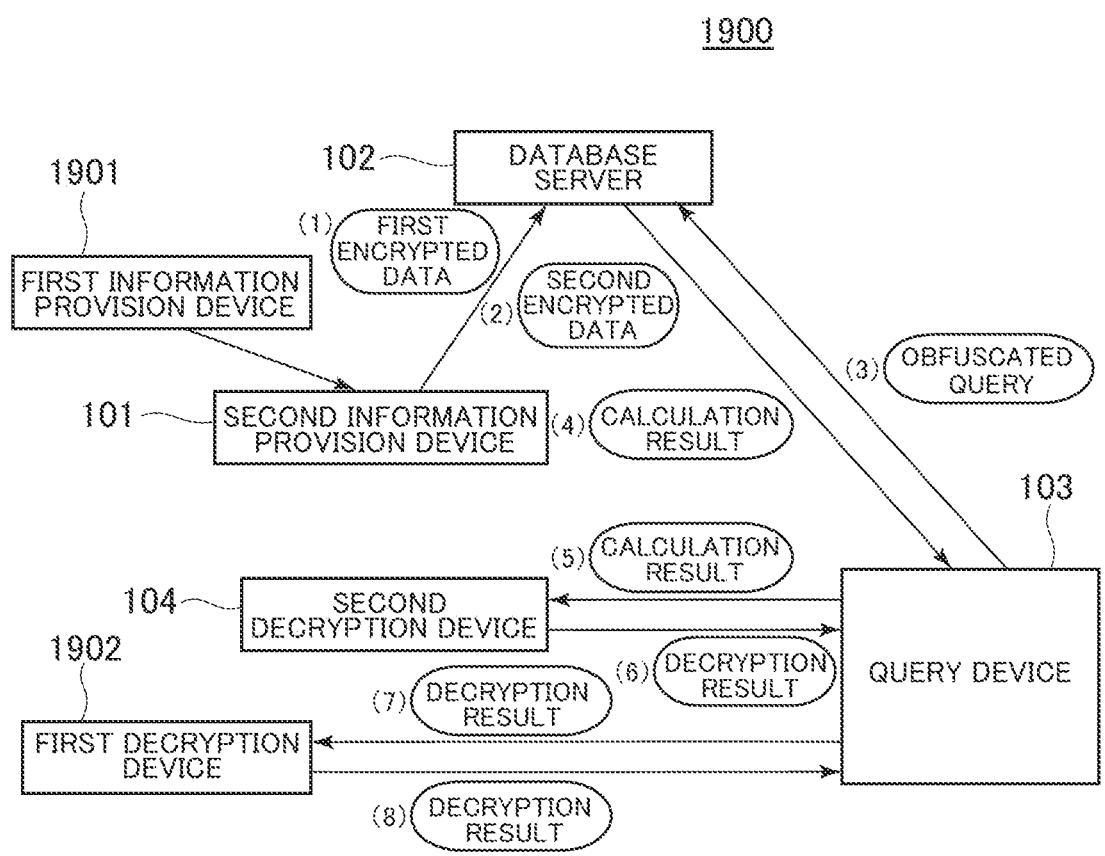
FIG. 20 is a diagram for description of a flow of data of a system according to an embodiment of the invention.

FIG. 20 illustrates a function block diagram and a flow of data of a system according to a third embodiment of the invention. A system 1900 includes the second information provision device 101, the database server 102, the query device 103, the second decryption device 104, the first information provision device 1901, and the first decryption device 1902.

When FIG. 1 and FIG. 20 are compared to each other, the information provision device 101 of FIG. 1 corresponds to the second information provision device of FIG. 20, and the decryption device 104 of FIG. 1 corresponds to the second decryption device 104 of FIG. 20. In addition, a configuration of FIG. 20 is a configuration in which the first information provision device 1901 and the first decryption device 1902 are added to the configuration of FIG. 1.

The first information provision device 1901 may have the same configuration as that of the second information provision device 101, and includes a data acquisition unit, a data encryption unit, a key information storage unit, and an encrypted data transmitter. In this case, the encrypted data transmitter of the first information provision device 1901 transmits data subjected to an encryption process by an encryption key of an operator of the first information provision device 1901 to the data acquisition unit 201 of the second information provision device 101. The encryption process in the first information provision device 1901 preferably maintains semi-homomorphism between first calculation and second calculation.

Therefore, in the present embodiment, data acquired by the first information provision device 1901 is subjected to the encryption process by the encryption key of the operator of the first information provision device 1901 and subjected to an encryption process by an encryption key of an operator of the second information provision device 101. As a result, the data is subjected to a double encryption process and stored in the database server 102.

In addition, the first decryption device 1902 performs a decryption process corresponding to the encryption process by the encryption key of the operator of the first information provision device 1901.

A flow of data in the present embodiment is described below.

(Step 1) Encrypted data is transmitted from the first information provision device 1901 to the second information provision device 101.

(Step 2) Data subjected to a double encryption process is transmitted from the second information provision device 101 to the database server 102 and stored in the database 401.

(Step 3) An obfuscated query is transmitted from the query device 103 to the database server 102. When the database server 102 receives the obfuscated query, calculation is performed for each segment of the obfuscated query.

(Step 4) A calculation result is transmitted from the database server 102 to the query device 103.

(Step 5) The calculation result received in step 4 is transmitted from the query device 103 to the second decryption device 104.

(Step 6) A decryption process is performed in the second decryption device 104, and a result of the decryption process is transmitted to the query device 103.

(Step 7) The result of the decryption process received in step 6 is transmitted from the query device 103 to the first decryption device 1902.

(Step 8) A decryption process is performed in the first decryption device 1902, and a result of the decryption process is transmitted to the query device 103.

In the present embodiment, since data is doubly encrypted by the encryption key of the operator of the first information provision device 1901 and the encryption key of the operator of the second information provision device 101, it is impossible to perform a decryption process without consents of the operator of the first information provision device 1901 and the operator of the second information provision device 101.

For example, in a case in which the operator of the first information provision device 1901 is a patient, and the operator of the second information provision device 101 is an attending physician of the patient, DNA data of the patient is encrypted by an encryption key of the patient and transmitted from the first information provision device 1901 to the second information provision device 101, the DNA data is encrypted by an encryption key of the attending physician and stored in the database 401, and search is performed by the query device 103. However, consents of the patient and the attending physician are needed for the user of the query device 103 to obtain a search result subjected to a decryption process. For this reason, privacy is ensured. For example, in a case in which at least one of the patient and the attending physician disagrees with the provision of information, information disclosure may be suppressed by refusing a subsequent decryption process.

Even when an order of the encryption process by the first information provision device 1901 and the encryption process by the second information provision device 101 is swapped, steps 5 and 6 and steps 7 and 8 may be interchanged and executed when the decryption process by the first decryption device 1902 may be performed after the decryption process by the second decryption device 104.

(Fourth Embodiment)

Figure 21:
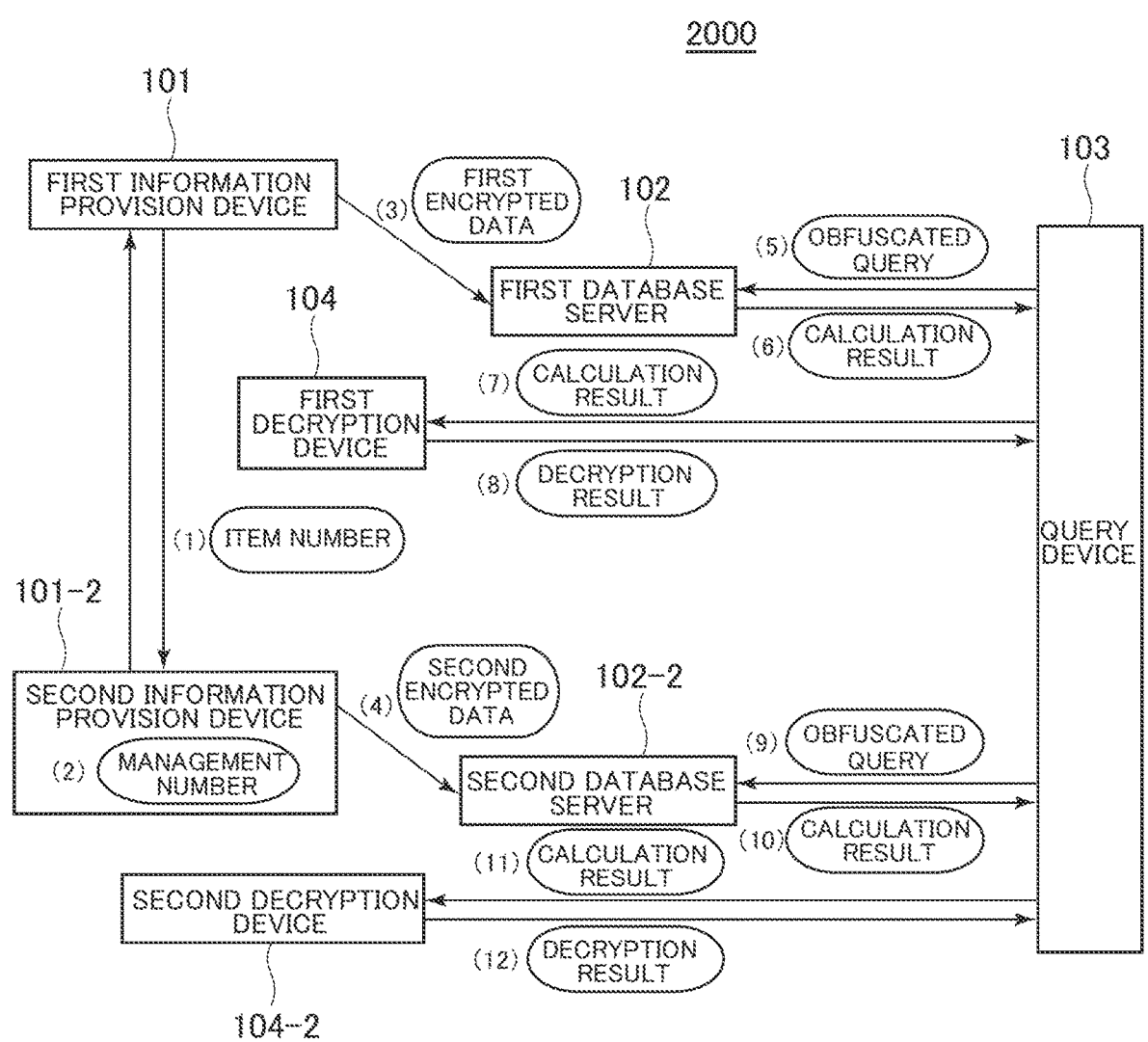
FIG. 21 is a diagram for description of a flow of data of a system according to an embodiment of the invention.

FIG. 21 is a function block diagram of a system according to a fourth embodiment of the invention. A system 2000 includes the first information provision device 101, the first database server 102, the query device 103, the first decryption device 104, the second information provision device 101-2, the second database server 102-2, and the second decryption device 104-2.

In FIG. 21, configuration parts of the first information provision device 101, the first database server 102, the query device 103, and the first decryption device 104 are similar to those of the above embodiment. In addition, configuration parts of the second information provision device 101-2, the second database server 102-2, the query device 103, and the second decryption device 104-2 are similar to those of the above embodiment. However, in the present embodiment, when encrypted data is stored in the first database server 102 from the first information provision device 101, information for identifying the encrypted data (item number in FIG. 21) is transmitted to the second information provision device 101-2, and the second information provision device 101-2 generates a management number corresponding to the item number on a one-to-one basis. In this instance, the second information provision device 101-2 may secretly generate the management number corresponding to the item number on a one-to-one basis with respect to the first information provision device 101.

The first information provision device 101 is allowed to obtain an encrypted item number as a calculation result by including the item number in first encrypted data stored in the first database server 102, and transmitting an obfuscated query from the query device 103 to the first database server.

In addition, the second information provision device 101-2 is allowed to obtain an encrypted management number as a calculation result by including the management number and the item number in second encrypted data stored in the second information provision device 101-2, and transmitting a query related to an obfuscated item number from the query device 103 to the second database server 102-2.

For example, the above configuration is effective when the operator of the first information provision device 101 is an article supply organization, data related to a supplied article is encrypted and stored in the first database server 102 by including an item number therein, and the operator of the second information provision device 101-2 is an organization independent from the article supply organization and the user of the query device. In particular, the above configuration is effective when a plurality of article supply organizations corresponding to the operator of the first information provision device 101 is present, and articles are managed in a common distribution center.

In this case, the article supply organization sends an article together with an item number to the second information provision device 101-2, and the second information provision device 101-2 stores the article in the distribution center by attaching the generated management number thereto. Only an operator of the second information provision device 101-2 may be aware of a correspondence between the item number and the management number. For this reason, both the article supply organization and the distribution center may be disallowed to know a management number with which an article is managed unless unpacking or unsealing each article. Therefore, confidentiality of articles in the distribution center may be enhanced.

An item number may be obtained by the user of the query device 103 transmitting an obfuscated query related to an article to the first database server and receiving a result of decryption by the first decryption device 104. However, the article supply organization is not allowed to detect what kind of query with which the user of the query device 103 has obtained the item number, and the article supply organization is not allowed to detect intention of the user of the query device 103.

Subsequently, the user of the query device 103 transmits a query with which the item number is obfuscated to the second database server 102-2 and receives a calculation result. Thereafter, the calculation result is transmitted to the second decryption device 104-2, and a result of a decryption process is obtained. In this way, the user of the query device 103 may obtain a management number, and obtain an article by presenting the management number to the distribution center. In this case, the operator of the second information provision device 102 is not allowed to detect what kind of query with which the user of the query device 103 has searched for the management number. Therefore, the operator of the second information provision device 102 is not allowed to detect intention of the user of the query device 103, and confidentiality of information may be maintained among the article supply organization, the administrator of the first database server 102, the query device 103, the operator of the second information provision device 102, and the administrator of the second database server 102-2.

(Fifth Embodiment)

As a fifth embodiment, a description will be given of a database server and an information provision device for updating encrypted vector data stored in the database server.

Figure 22:
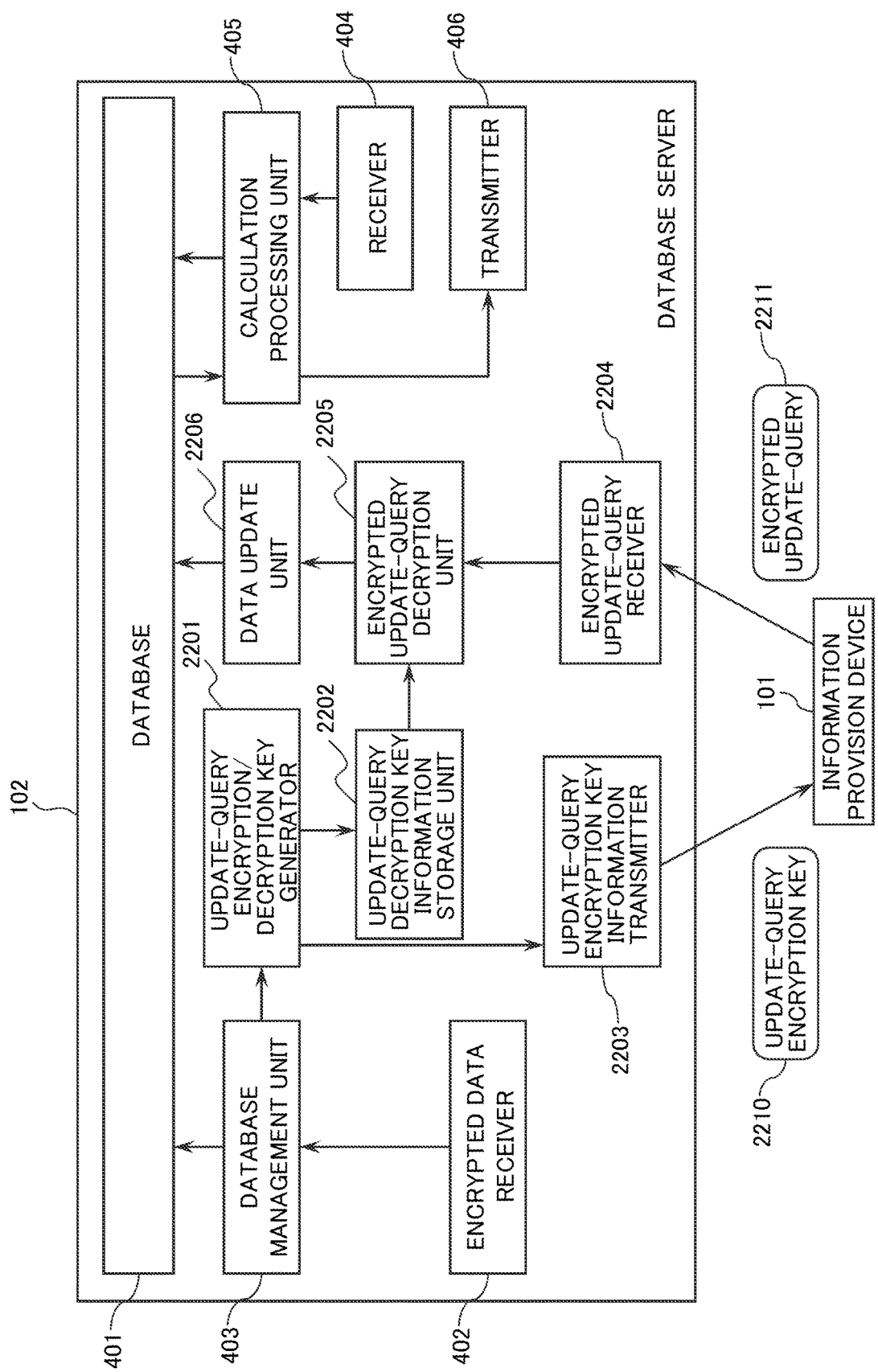
FIG. 22 is a function block diagram of a database server of a system according to an embodiment of the invention.

FIG. 22 illustrates a function block diagram of a database server according to a fifth embodiment. A database server 102 includes a database 401, an encrypted data receiver 402, a database management unit 403, a calculation processing unit 405, a receiver 404, a transmitter 406, an update-query encryption/decryption key generator 2201, an update-query decryption key information storage unit 2202, an update-query encryption key information transmitter 2203, an encrypted update-query receiver 2204, an encrypted update-query decryption unit 2205, and a data update unit 2206.

In other words, the database server 102 illustrated in the function block diagram of FIG. 22 may be regarded as the database server 102 according to any one of the first embodiment to the fourth embodiment further including the update-query encryption/decryption key generator 2201, the update-query decryption key information storage unit 2202, the update-query encryption key information transmitter 2203, the encrypted update-query receiver 2204, the encrypted update-query decryption unit 2205, and the data update unit 2206.

The update-query encryption/decryption key generator 2201 generates an encryption key when the database management unit 403 stores an encrypted vector in the database 401. When encryption by the encryption key corresponds to a public key cryptography process, a public key corresponding with the encryption key as a private key is also generated. The generated encryption key (for example, the private key and the public key) may be different for each encrypted vector stored in the database 401.

The update-query decryption key information storage unit 2202 stores the encryption key (for example, the private key) generated by the update-query encryption/decryption key generator 2201 in association with the stored encrypted vector when the encrypted vector is stored in the database 401. For example, the encryption key is stored in association with information that uniquely identifies the encrypted vector and that are stored in the column 501 illustrated in FIG. 5.

The update-query encryption key information transmitter 2203 transmits the encryption key (for example, the public key with respect to the private key) generated by the update-query encryption/decryption key generator 2201 to the information provision device 101. In this way, the information provision device 101 may receive and acquire the encryption key corresponding to the encrypted data transmitted to the database server 102. The encryption key is referred to as an "update-query encryption key" 2210.

When the information provision device 101 desires to update the encrypted vector, an update-query representing update is encrypted by the update-query encryption key 2210. When partial data of the encrypted vector is desired to be updated, identification information of the encrypted vector and information of a range of the encrypted vector to be updated identified by the identification information is also encrypted by the update-query encryption key 2210. The update-query encrypted in this way is referred to as an encrypted update-query 2211.

The encrypted update-query receiver 2204 receives the encrypted update-query from the information provision device 101.

The encrypted update-query decryption unit 2205 decrypts the encrypted update-query 2211 received by the encrypted update-query receiver 2204 using an update-query decryption key stored in the update-query decryption key information storage unit 2202. Through this decryption, it is possible to obtain encrypted vector data after update, identification information of the encrypted vector data to update as appropriate, and information of a range to be updated (for example, a range of data corresponding to a name of an update column) in the database server 102.

The data update unit 2206 updates the encrypted vector data stored in the database 401 based on a result of decryption of the encrypted update-query by the encrypted update-query decryption unit 2205.

Update may be performed by overwriting on the encrypted vector data. In addition, when data Enc(m) of the encrypted vector data is updated with Enc(n), Enc(n−m) may be calculated by the information provision device 101 and included in the encrypted update-query. In this case, the database server 102 overwrites Enc(m) with a result obtained by calculating Enc(m)*Enc(n−m). Since Enc(m)*Enc(n−m)=Enc(m+n−m)=Enc(n) is satisfied due to a property of semi-homomorphism, Enc(m) may be updated with Enc(n).

In addition, when Enc(m) is updated with Enc(0), the information provision device may calculate Enc(−m) and include Enc(−m) in the encrypted update-query.

Figure 23:
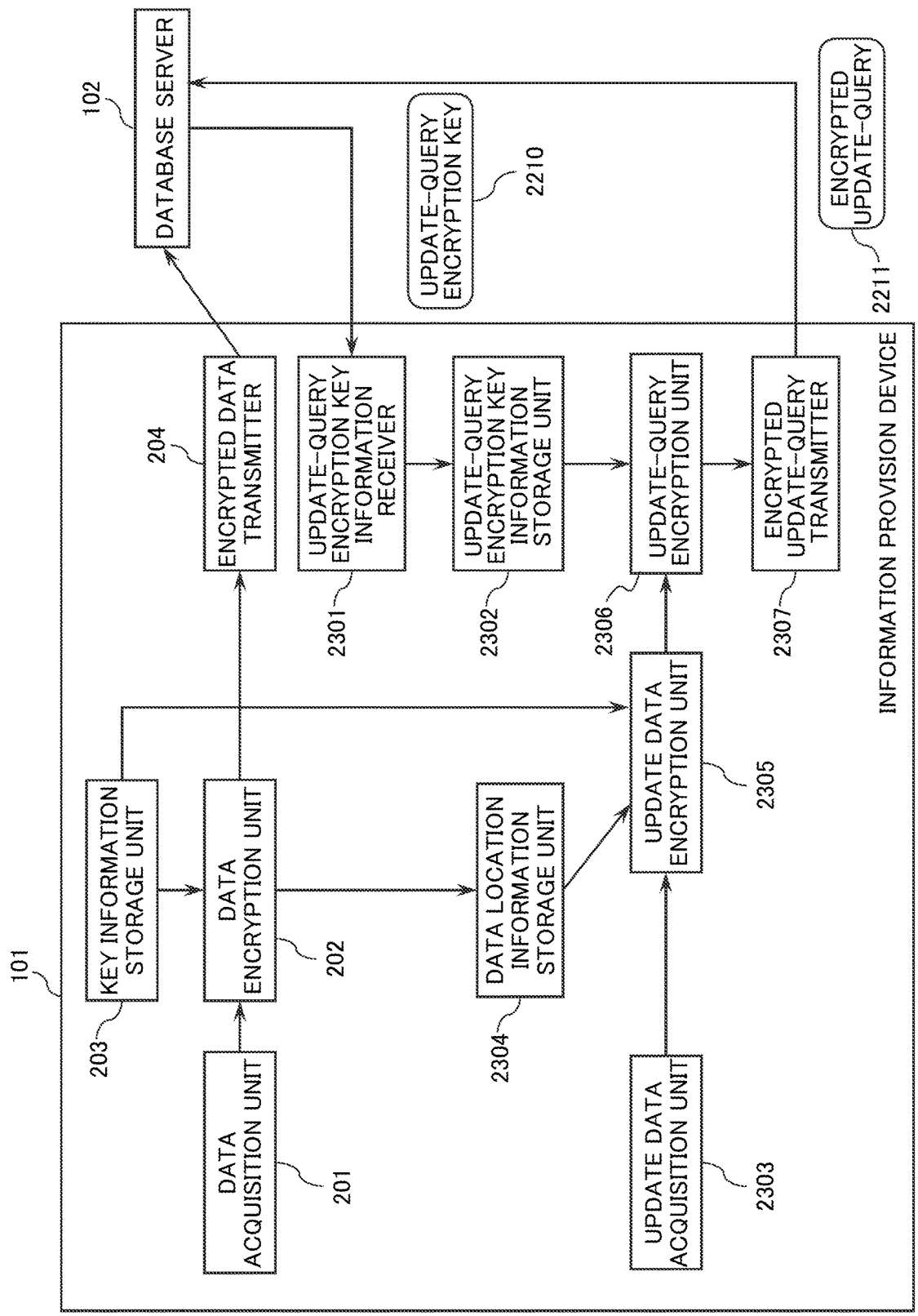
FIG. 23 is a diagram for description of an encryption process by an information provision device of the system according to the embodiment of the invention.

FIG. 23 illustrates a function block diagram of an information provision device 101 according to a fifth embodiment. The information provision device 101 includes a data acquisition unit 201, a data encryption unit 202, a key information storage unit 203, an encrypted data transmitter 204, an update data acquisition unit 2303, a data location information storage unit 2304, an update data encryption unit 2305, an update-query encryption key information receiver 2301, an update-query encryption key information storage unit 2302, an update-query encryption unit 2306, and an encrypted update-query transmitter 2307.

In other words, the information provision device 101, the function block diagram of which is illustrated in FIG. 23, has a configuration in which the information provision device 101 according to any one of the first embodiment to the fourth embodiment further includes the update data acquisition unit 2303, the data location information storage unit 2304, the update data encryption unit 2305, the update-query encryption key information receiver 2301, the update-query encryption key information storage unit 2302, the update-query encryption unit 2306, and the encrypted update-query transmitter 2307.

The update-query encryption key information receiver 2301 receives the update-query encryption key 2210 generated by the database server 102 and transmitted by the update-query encryption key information transmitter 2203 in response to transmission of the encrypted vector data by the encrypted data transmitter 204.

The update-query encryption key information storage unit 2302 stores the update-query encryption key 2210 received by the update-query encryption key information receiver 2301. For example, when the encrypted data transmitter 204 transmits the encrypted vector data, the database server 102 stores the encrypted vector data in the database 401, and identification information of the stored encrypted vector data is transmitted along with the update-query encryption key 2210, the update-query encryption key information storage unit 2302 stores the update-query encryption key 2210 in association with the identification information of the encrypted vector data.

The update data acquisition unit 2303 acquires update data. In addition to the update data, the update data acquisition unit 2303 may acquire identification information of encrypted vector data and information of a range to be updated (for example, a name of an update column).

For example, when the update data acquisition unit 2303 acquires the update range by the name of the update column, the data location information storage unit 2304 associates the name of the update column with the update range and stores the name of the update column and the update range in order to convert the name of the update column into the update range (for example, a range according to the number of elements of the encrypted vector data).

The update data encryption unit 2305 encrypts data acquired by the update data acquisition unit 2303 using key information stored by the key information storage unit 203. The update data encryption unit 2305 outputs a result of encryption and outputs the identification information of the encrypted vector data and the update range obtained from the data location information storage unit 2304 as appropriate to the update-query encryption unit 2306.

The update-query encryption unit 2306 encrypts the result of encryption by the update data encryption unit 2305 using the update-query encryption key stored in the update-query encryption key information storage unit 2302. In this instance, when the update data encryption unit 2305 outputs the identification information of the encrypted vector data and the update range obtained from the data location information storage unit 2304, the update-query encryption key stored in the update-query encryption key information storage unit 2302 is read in association with the output identification information of the encrypted vector data, and encryption is performed using the read update-query encryption key to generate an encrypted update-query. The update range may be encrypted and included in the encrypted update-query by data encrypted by the update-query encryption key stored in the update-query encryption key information storage unit 2302 in association with the identification information of the encrypted vector data.

In addition, in a case in which the update data encryption unit 2305 does not output the identification information of the encrypted vector data, for example, the update-query encryption unit 2306 regards the case as addition of new encrypted vector data, and does not perform encryption more than encryption using the encryption key stored in the key information storage unit 203 or perform encryption using a default encryption key.

The encrypted update-query transmitter 2307 transmits the encrypted update-query 2211 corresponding to an encryption result by the update-query encryption unit 2306 to the database server 102.

As described above, in the present embodiment, it is possible to update an arbitrary encrypted vector and an arbitrary entry of the encrypted vector in the encrypted vector data transmitted from the information provision device 101. In particular, since an update-query is encrypted by an update-query encryption key generated each time the encrypted vector data is stored and transmitted from the information provision device 101 to the database server 102, anyone other than the information provider and the administrator of the database server 102 is not allowed to perform decryption, and confidentiality may be enhanced.

In addition, when encrypted vector data is updated with data obtained by encrypting 0, the data may be treated as data representing 0 in calculation of the calculation processing unit 405 of the database server. Thus, it is possible to practically obtain the same effect as deletion. In other words, data may be deleted by updating to data obtained by encrypting 0.

REFERENCE SIGNS LIST 100 calculation system
101 information provision device (second information provision device)
102 database server
103 query device (terminal device)
104 decryption device (second decryption device)
201 data acquisition unit
202 data encryption unit
203 key information storage unit
204 encrypted data transmitter
401 database
402 encrypted data receiver
403 database management unit
404 receiver
405 calculation processing unit
406 transmitter
801 query acquisition unit
802 query obfuscation unit
803 query transmitter
804 calculation result receiver
805 calculation result transmitter
806 decryption result receiver
807 deobfuscation unit
808 obfuscation information storage unit
809 output unit
1001 decryption key storage unit
1002 result receiver
1003 decryption unit
1004 decryption result transmitter
1901 first information provision device
1902 first decryption device
2201 update-query encryption/decryption key generator
2202 update-query decryption key information storage unit
2203 update-query encryption key information transmitter
2204 encrypted update-query receiver
2205 encrypted update-query decryption unit
2206 data update unit
2210 update-query encryption key
2211 encrypted update-query
2301 update-query encryption key information receiver
2302 update-query encryption key information storage unit
2303 update data acquisition unit
2304 data location information storage unit
2305 update data encryption unit
2306 update-query encryption unit
2307 encrypted update-query transmitter

What is claimed is:

1. A terminal device comprising:
   processor circuitry and a memory;
   the processor circuitry being configured to;
   acquire a query having a plurality of data items;
   generate a plurality of N-randomized vectors from the query, an i-th segment of each of the plurality of N-randomized vectors being a segment including an i-th segment of the query or random data when the query and the plurality of N-randomized vectors are each segmented into N segments, each of the segments of the query being included as one or more segments of the plurality of N-randomized vectors;
   store identification information of the plurality of N-randomized vectors including each of the segments of the query into the memory;
   transmit the plurality of N-randomized vectors to a database server, the database server being a database server that stores an encrypted vector obtained by encrypting each of a plurality of elements by encryption in which a result of first calculation before the encryption corresponds to a result obtained by decrypting a result of second calculation after the encryption, segments the encrypted vector into N encrypted segments with respect to the plurality of N-randomized vectors, and generates an encryption calculation result acquired by encrypting a calculation result obtained by performing the first calculation based on each data item of the i-th segment of each of the plurality of N-randomized vectors with respect to each element before encrypting each element of an i-th encrypted segment by performing the second calculation based on each data item of the i-th segment of each of the plurality of N-randomized vectors with respect to each element of the i-th encrypted segment of the encrypted vector;
   receive a calculation result obtained by performing decryption corresponding to the encryption on the encryption calculation result in response to transmission of the plurality of N-randomized vectors to the database server;
   receive the encryption calculation result from the database server;
   transmit the received encryption calculation result to a decryption device;
   receive a calculation result decrypted by the decryption device; and
   carry out calculation to obtain a calculation result on the query and each element before encrypting each element of the encrypted vector based on the received calculation result and the identification information stored in the memory.

2. The terminal device according to claim 1, wherein each of the plurality of elements represents information of one bit, and the query represents a bit string.

3. The terminal device according to claim 1, wherein the first calculation corresponds to addition, and the second calculation corresponds to multiplication.

4. The terminal device according to claim 3, wherein the second calculation corresponds to multiplication in a group having a generator.

5. The terminal device according to claim 4, wherein an order of the generator is finite.

6. A database server comprising:
   processor circuitry, a memory, and a database;
   the processor circuitry being configured to;
   store, into the database, an encrypted vector including an encrypted element obtained by encrypting each of a plurality of elements by a process of encryption in which a result of first calculation before the encryption corresponds to a result obtained by decrypting a result of second calculation after the encryption;
   receive a plurality of N-randomized vectors generated from a query having a plurality of data items, an i-th segment of each of the plurality of N-randomized vectors being a segment including an i-th segment of the query or random data when the query and the plurality of N-randomized vectors are each segmented into N segments, each of the segments of the query being included as one or more segments of the plurality of N-randomized vectors;
   calculate an encryption calculation result acquired by encrypting a calculation result obtained by performing the first calculation based on each data item of the i-th segment of each of the plurality of N-randomized vectors with respect to each element before encrypting each element of an i-th encrypted segment obtained by segmenting the encrypted vector into N segments by performing the second calculation based on each data item of the i-th segment of each of the plurality of N-randomized vectors with respect to each element of an i-th segment of the encrypted vector;
   transmit the encryption calculation result;
   store, into the memory, a decryption key associated with an encrypted vector stored in thee database;
   receive information obtained by encrypting a range of the encrypted element of the encrypted vector stored in the database and an encrypted element replacing an encrypted element in the range; and
   update the encrypted element of the encrypted vector in the range based on a result of decrypting the received information using the decryption key.

7. The database server according to claim 6, wherein the encryption calculation result corresponds to a calculation result based on each data item of the i-th segment S(i) of each of the plurality of N-randomized vectors, and the calculation result based on each data item of the segment S(i) is equivalent to a calculation result $\Pi_j d_{ij}^{Sij}$ obtained by applying the second calculation to a result of calculating a power $d_{ij}^{Sij}$ obtained by applying the second calculation a number of times of an integer Sij represented by a j-th data item included in the segment S(i) to a j-th encrypted element $d_{ij}$ of the i-th segment of the encrypted vector.

8. The database server according to claim 6, wherein each of the plurality of elements represents information of one bit, and the query represents a bit string.

9. The database server according to claim 8, wherein a calculation result calculated using the first calculation is a value corresponding to a Tversky Index of the segment S(i) and a segment including an element before encrypting each element of the i-th segment of the encrypted vector.

10. The database server according to claim 6, wherein the first calculation corresponds to addition, and the second calculation corresponds to multiplication.

11. The database server according to claim 10, wherein the second calculation corresponds to multiplication in a group having a generator.

12. The database server according to claim 11, wherein an order of the generator is finite.

13. The database server according to claim 6, wherein a probabilistic encryption is used in a process of the encryption.

14. The database server according to claim 6, wherein the processor circuitry updates the encrypted element of the encrypted vector with a result of the second calculation with respect to the encrypted element of the encrypted vector and an encrypted element included in the decryption result.

15. A calculation system comprising:
a database server comprising fourth processor circuitry;
an information provision device comprising first processor circuitry;
a decryption device comprising second processor circuitry; and
a terminal device comprising third processor circuitry,
wherein the first processor circuitry in the information provision device is configured to:
acquire a set of elements having a plurality of elements,
encrypt each of the plurality of elements by encryption in which a result of first calculation before encryption corresponds to a result obtained by decrypting a result of second calculation after the encryption to generate an encrypted vector, and
transmit the generated encrypted vector to the database server,
the second processor circuitry in the decryption device is configured to:
receive encrypted data,
decrypt the received data, and
transmit a result of the decryption,
the third processor circuitry in the terminal device is configured to:
acquire a query having a plurality of data items,
generate a plurality of N-randomized vectors from the query, an i-th segment of each of the plurality of N-randomized vectors being a segment including an i-th segment of the query or random data when the query and the plurality of N-randomized vectors are each segmented into N segments, each of the segments of the query being included as one or more segments of the plurality of N-randomized vectors,
store identification information of the plurality of N-randomized vectors including each of the segments of the query into the memory,
transmit the plurality of N-randomized vectors to the database server,
receive a result of decrypting a calculation result in the database server with regard to each segment of the plurality of N-randomized vectors from the decryption device in response to transmission of the N-randomized vectors, and
carry out calculation to obtain a calculation result on the query and each element before encrypting each element of the encrypted vector based on the received calculation result and the identification information stored in the memory, and
the fourth processor circuitry of the database server is configured to:
store, into the database, the encrypted vector transmitted from the information provision device,
receive the plurality of N-randomized vectors transmitted from the terminal device,
calculate an encryption calculation result acquired by encrypting a calculation result obtained by performing the first calculation based on each data item of the i-th segment of each of the plurality of N-randomized vectors with respect to each element before encrypting each element of an i-th encrypted segment obtained by segmenting the encrypted vector into N segments by performing the second calculation based on each data item of the i-th segment of each of the plurality of N-randomized vectors with respect to each element of an i-th segment of the encrypted vector, and
transmit the encryption calculation result.

* * * * *